United States Patent
Ribbich et al.

(10) Patent No.: US 10,712,038 B2
(45) Date of Patent: Jul. 14, 2020

(54) MULTI-FUNCTION THERMOSTAT WITH AIR QUALITY DISPLAY

(71) Applicant: Johnson Controls Technology Company, Auburn Hills, MI (US)

(72) Inventors: Joseph R. Ribbich, Waukesha, WI (US); Justin J. Ploegert, Cudahy, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 64 days.

(21) Appl. No.: 15/951,761

(22) Filed: Apr. 12, 2018

(65) Prior Publication Data

US 2018/0299161 A1    Oct. 18, 2018

Related U.S. Application Data

(60) Provisional application No. 62/485,789, filed on Apr. 14, 2017.

(51) Int. Cl.
```
G05D 23/00     (2006.01)
F24F 11/523    (2018.01)
F24F 11/00     (2018.01)
F24F 11/38     (2018.01)
F24F 110/66    (2018.01)
F24F 110/20    (2018.01)
```
(Continued)

(52) U.S. Cl.
CPC ........ *F24F 11/523* (2018.01); *F24F 11/0001* (2013.01); *F24F 11/38* (2018.01); *F24F 2110/10* (2018.01); *F24F 2110/20* (2018.01); *F24F 2110/66* (2018.01); *F24F 2110/70* (2018.01); *F24F 2110/72* (2018.01); *Y02B 30/78* (2013.01)

(58) Field of Classification Search
CPC .................................................. F24F 11/0086
USPC ......................................................... 700/276
See application file for complete search history.

(56) References Cited

U.S. PATENT DOCUMENTS 5,065,813 A    11/1991   Berkeley et al.
5,082,173 A    1/1992    Poehlman et al.
(Continued)

FOREIGN PATENT DOCUMENTS

CA    2466854 C    4/2008
CA    2633200 C    1/2011
(Continued)

OTHER PUBLICATIONS

Search Report for International Application No. PCT/US2018/027324, dated Aug. 23, 2018, 6 pages.
(Continued)

*Primary Examiner* — Suresh Suryawanshi
(74) *Attorney, Agent, or Firm* — Foley & Lardner LLP

(57) ABSTRACT

An HVAC system within a building includes one or more sensors and a thermostat. The thermostat has a processor that is configured to receive air quality information relating to one or more air quality components. The thermostat is further configured to determine a performance level corresponding to each air quality component. The thermostat is further configured to determine one or more parameter values for each air quality component. The thermostat is further configured to generate an icon that visually represents each air quality component.

20 Claims, 16 Drawing Sheets

(51) Int. Cl.
*F24F 110/72* (2018.01)
*F24F 110/10* (2018.01)
*F24F 110/70* (2018.01)

(56) References Cited

U.S. PATENT DOCUMENTS

| | | | |
|---|---|---|---|
| 5,161,606 A | 11/1992 | Berkeley et al. |
| 5,232,152 A | 8/1993 | Tsang |
| 5,364,026 A | 11/1994 | Kundert |
| 5,381,950 A * | 1/1995 | Aldridge ............ G05D 23/1902 |
| | | | 236/1 R |
| 5,433,377 A | 7/1995 | Sodo et al. |
| 5,482,210 A | 1/1996 | Carey et al. |
| 5,547,107 A | 8/1996 | Boiardi |
| 5,902,183 A | 5/1999 | D'Souza |
| 5,950,709 A | 9/1999 | Krueger et al. |
| 6,119,680 A | 9/2000 | Barritt |
| 6,161,764 A | 12/2000 | Jatnieks |
| 6,164,374 A | 12/2000 | Rhodes et al. |
| 6,169,937 B1 | 1/2001 | Peterson |
| 6,318,639 B1 | 11/2001 | Toth |
| 6,351,693 B1 | 2/2002 | Monie et al. |
| 6,398,118 B1 | 6/2002 | Rosen et al. |
| 6,431,268 B1 | 8/2002 | Rudd |
| 6,435,418 B1 | 8/2002 | Toth et al. |
| 6,467,695 B1 | 10/2002 | Riley et al. |
| 6,514,138 B2 | 2/2003 | Estepp |
| 6,557,771 B2 | 5/2003 | Shah |
| 6,641,054 B2 | 11/2003 | Morey |
| 6,726,112 B1 | 4/2004 | Ho |
| 6,726,113 B2 | 4/2004 | Guo |
| 6,810,307 B1 | 10/2004 | Addy |
| 6,824,069 B2 | 11/2004 | Rosen |
| 6,888,441 B2 | 5/2005 | Carey |
| 6,920,874 B1 | 7/2005 | Siegel |
| 6,935,570 B2 | 8/2005 | Acker, Jr. |
| 6,941,193 B2 | 9/2005 | Frecska et al. |
| 6,988,671 B2 | 1/2006 | Deluca |
| 6,995,518 B2 | 2/2006 | Havlik et al. |
| 7,028,912 B1 * | 4/2006 | Rosen ................. G05D 23/1905 |
| | | | 236/1 C |
| 7,044,397 B2 | 5/2006 | Bartlett et al. |
| 7,083,109 B2 | 8/2006 | Pouchak |
| 7,113,086 B2 | 9/2006 | Shorrock |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,222,494 B2 | 5/2007 | Peterson et al. |
| 7,226,496 B2 | 6/2007 | Ehlers |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,320,110 B2 | 1/2008 | Shah |
| 7,325,748 B2 | 2/2008 | Acker, Jr. |
| 7,331,187 B2 | 2/2008 | Kates |
| 7,343,751 B2 | 3/2008 | Kates |
| 7,402,780 B2 | 7/2008 | Mueller et al. |
| 7,434,413 B2 | 10/2008 | Wruck |
| 7,434,744 B2 | 10/2008 | Garozzo et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,758,408 B2 | 7/2010 | Hagentoft |
| 7,765,826 B2 | 8/2010 | Nichols |
| 7,784,291 B2 | 8/2010 | Butler et al. |
| 7,784,704 B2 | 8/2010 | Harter |
| 7,788,936 B2 | 9/2010 | Peterson et al. |
| 7,793,510 B2 | 9/2010 | Perry et al. |
| 7,798,418 B1 | 9/2010 | Rudd |
| 7,802,618 B2 | 9/2010 | Simon et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 8,010,237 B2 | 8/2011 | Cheung et al. |
| 8,032,254 B2 | 10/2011 | Amundson et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,091,796 B2 | 1/2012 | Amundson et al. |
| 8,099,195 B2 | 1/2012 | Imes et al. |
| 8,100,746 B2 | 1/2012 | Heidel et al. |
| 8,108,076 B2 | 1/2012 | Imes et al. |
| 8,131,506 B2 | 3/2012 | Steinberg et al. |
| 8,141,373 B2 | 3/2012 | Peterson et al. |
| 8,141,791 B2 | 3/2012 | Rosen |
| 8,165,721 B2 | 4/2012 | Petit |
| 8,167,216 B2 | 5/2012 | Schultz et al. |
| 8,180,492 B2 | 5/2012 | Steinberg |
| 8,185,244 B2 | 5/2012 | Wolfson |
| 8,190,296 B2 | 5/2012 | Alhilo |
| 8,190,367 B2 | 5/2012 | Bassa |
| 8,195,313 B1 | 6/2012 | Fadell et al. |
| 8,196,185 B2 | 6/2012 | Geadelmann et al. |
| 8,209,059 B2 | 6/2012 | Stockton |
| 8,214,085 B2 | 7/2012 | Boudreau et al. |
| 8,219,249 B2 | 7/2012 | Harrod et al. |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,488 B2 | 4/2013 | Steinberg et al. |
| 8,429,566 B2 | 4/2013 | Koushik et al. |
| 8,463,344 B2 | 6/2013 | Williams |
| 8,473,109 B1 | 6/2013 | Imes et al. |
| 8,476,964 B1 | 7/2013 | Atri |
| 8,489,243 B2 | 7/2013 | Fadell et al. |

(56) References Cited

U.S. PATENT DOCUMENTS

| | | |
|---|---|---|
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,511,578 B2 | 8/2013 | Has |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,523,803 B1 | 9/2013 | Favreau |
| 8,527,096 B2 | 9/2013 | Pavlak et al. |
| 8,532,827 B2 | 9/2013 | Stefanski et al. |
| 8,543,244 B2 | 9/2013 | Keeling et al. |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,640,970 B2 | 2/2014 | Dorendorf |
| 8,644,009 B2 | 2/2014 | Rylski et al. |
| 8,659,302 B1 | 2/2014 | Warren et al. |
| 8,671,702 B1 | 3/2014 | Shotey et al. |
| 8,689,572 B2 | 4/2014 | Evans et al. |
| 8,694,164 B2 | 4/2014 | Grohman et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,757,507 B2 | 6/2014 | Fadell et al. |
| 8,766,194 B2 | 7/2014 | Filson et al. |
| 8,768,521 B2 | 7/2014 | Amundson et al. |
| 8,770,490 B2 | 7/2014 | Drew |
| 8,770,491 B2 | 7/2014 | Warren et al. |
| 8,788,103 B2 | 7/2014 | Warren et al. |
| 8,802,981 B2 | 8/2014 | Wallaert et al. |
| 8,838,282 B1 | 9/2014 | Ratliff et al. |
| 8,843,239 B2 | 9/2014 | Mighdoll et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,874,497 B2 | 10/2014 | Raestik et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,924,026 B2 | 12/2014 | Federspiel et al. |
| 8,939,827 B2 | 1/2015 | Boudreau et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,026,232 B2 | 5/2015 | Fadell et al. |
| 9,033,255 B2 | 5/2015 | Tessier et al. |
| RE45,574 E | 6/2015 | Harter |
| 9,056,539 B2 | 6/2015 | Mirza et al. |
| 9,074,784 B2 | 7/2015 | Sullivan et al. |
| 9,075,419 B2 | 7/2015 | Sloo et al. |
| 9,080,782 B1 | 7/2015 | Sheikh |
| 9,080,784 B2 | 7/2015 | Dean-Hendricks et al. |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,286,781 B2 | 3/2016 | Filson et al. |
| 9,291,358 B2 | 3/2016 | Federspiel et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,332,322 B2 | 5/2016 | Niemeyer et al. |
| D763,707 S | 8/2016 | Sinha et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,594,384 B2 | 3/2017 | Bergman et al. |
| 9,618,224 B2 | 4/2017 | Emmons et al. |
| 9,638,429 B2 | 5/2017 | O'Hayer |
| 9,671,125 B2 | 6/2017 | Mowris et al. |
| 9,677,772 B2 | 6/2017 | Siegel et al. |
| 9,683,753 B2 | 6/2017 | Lorenz et al. |
| 9,684,317 B2 | 6/2017 | Fadell et al. |
| 9,696,052 B2 | 7/2017 | Malchiondo et al. |
| 9,810,441 B2 | 11/2017 | Dean-Hendricks et al. |
| 2001/0015281 A1 | 8/2001 | Schiedegger et al. |
| 2003/0034897 A1 | 2/2003 | Shamoon et al. |
| 2003/0034898 A1 | 2/2003 | Shamoon et al. |
| 2003/0177012 A1 | 9/2003 | Drennan |
| 2004/0041564 A1* | 3/2004 | Brown .............. A61L 9/122 324/318 |
| 2004/0074978 A1 | 4/2004 | Rosen |
| 2004/0262410 A1 | 12/2004 | Hull |
| 2005/0040943 A1 | 2/2005 | Winick |
| 2005/0083168 A1 | 4/2005 | Breitenbach |
| 2005/0194456 A1 | 9/2005 | Tessier et al. |
| 2005/0195757 A1 | 9/2005 | Kidder et al. |

(56) References Cited

U.S. PATENT DOCUMENTS

| | | |
|---|---|---|
| 2005/0224069 A1 | 10/2005 | Patil et al. |
| 2005/0270151 A1 | 12/2005 | Winick |
| 2006/0004492 A1 | 1/2006 | Terlson et al. |
| 2006/0038025 A1 | 2/2006 | Lee |
| 2006/0113398 A1 | 6/2006 | Ashworth |
| 2006/0192022 A1 | 8/2006 | Barton et al. |
| 2006/0213000 A1 | 9/2006 | Kimble et al. |
| 2006/0260334 A1 | 11/2006 | Carey et al. |
| 2006/0265489 A1 | 11/2006 | Moore |
| 2007/0045431 A1 | 3/2007 | Chapman et al. |
| 2007/0045441 A1 | 3/2007 | Ashworth et al. |
| 2007/0050732 A1 | 3/2007 | Chapman et al. |
| 2007/0057079 A1 | 3/2007 | Stark et al. |
| 2007/0062513 A1 | 3/2007 | Gagas |
| 2007/0114295 A1 | 5/2007 | Jenkins |
| 2007/0198099 A9 | 8/2007 | Shah |
| 2007/0221741 A1 | 9/2007 | Wagner et al. |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2007/0244576 A1 | 10/2007 | Potucek et al. |
| 2007/0264927 A1 | 11/2007 | Choi et al. |
| 2008/0011863 A1 | 1/2008 | Roux et al. |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0102744 A1 | 5/2008 | Moore et al. |
| 2008/0120446 A1 | 5/2008 | Butler et al. |
| 2008/0161978 A1 | 7/2008 | Shah |
| 2008/0216495 A1 | 9/2008 | Kates |
| 2008/0223051 A1 | 9/2008 | Kates |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0001179 A1 | 1/2009 | Dempsey |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0251422 A1 | 10/2009 | Wu et al. |
| 2009/0276096 A1 | 11/2009 | Proffitt et al. |
| 2010/0070089 A1* | 3/2010 | Harrod .................. G05B 19/042 700/277 |
| 2010/0070092 A1 | 3/2010 | Winter et al. |
| 2010/0084482 A1 | 4/2010 | Kennedy et al. |
| 2010/0107076 A1* | 4/2010 | Grohman .................. F24F 11/30 715/709 |
| 2010/0131884 A1 | 5/2010 | Shah |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0204834 A1 | 8/2010 | Comerford et al. |
| 2010/0212879 A1 | 8/2010 | Schnell et al. |
| 2011/0006887 A1 | 1/2011 | Shaull et al. |
| 2011/0007017 A1 | 1/2011 | Wallaert |
| 2011/0010652 A1 | 1/2011 | Wallaert |
| 2011/0010653 A1 | 1/2011 | Wallaert et al. |
| 2011/0067851 A1 | 3/2011 | Terlson et al. |
| 2011/0088416 A1 | 4/2011 | Koethler |
| 2011/0132991 A1 | 6/2011 | Moody et al. |
| 2011/0181412 A1 | 7/2011 | Alexander et al. |
| 2011/0223850 A1 | 9/2011 | Narayanamurthy et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0023428 A1 | 1/2012 | Kennard et al. |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0126020 A1 | 5/2012 | Filson et al. |
| 2012/0126021 A1 | 5/2012 | Warren et al. |
| 2012/0130547 A1* | 5/2012 | Fadell ...................... F24F 11/30 700/276 |
| 2012/0131504 A1* | 5/2012 | Fadell .................. F24D 19/1084 715/810 |
| 2012/0165993 A1 | 6/2012 | Whitehouse |
| 2012/0181010 A1 | 7/2012 | Schultz et al. |
| 2012/0190294 A1 | 7/2012 | Heidel et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0245740 A1 | 9/2012 | Raestik et al. |
| 2012/0252345 A1 | 10/2012 | Wolfson |
| 2012/0298763 A1 | 11/2012 | Young |
| 2012/0303828 A1 | 11/2012 | Young et al. |
| 2012/0310418 A1 | 12/2012 | Harrod et al. |
| 2013/0002447 A1 | 1/2013 | Vogel et al. |
| 2013/0040550 A1 | 2/2013 | Pfister et al. |
| 2013/0054758 A1 | 2/2013 | Imes et al. |
| 2013/0057381 A1 | 3/2013 | Kandhasamy |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0099010 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0180700 A1 | 7/2013 | Aycock |
| 2013/0190932 A1 | 7/2013 | Schuman |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0221117 A1 | 8/2013 | Warren et al. |
| 2013/0226352 A1 | 8/2013 | Dean-Hendricks et al. |
| 2013/0228633 A1 | 9/2013 | Toth et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268129 A1 | 10/2013 | Fadell et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0081466 A1 | 3/2014 | Huapeng et al. |
| 2014/0099872 A1 | 4/2014 | Matsumoto et al. |
| 2014/0112331 A1 | 4/2014 | Rosen |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0130574 A1 | 5/2014 | Happ et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0175181 A1 | 6/2014 | Warren et al. |
| 2014/0188287 A1 | 7/2014 | Sabata |
| 2014/0188288 A1 | 7/2014 | Fisher et al. |
| 2014/0191848 A1 | 7/2014 | Imes et al. |
| 2014/0202449 A1 | 7/2014 | Snyder |
| 2014/0207291 A1 | 7/2014 | Golden et al. |
| 2014/0207292 A1 | 7/2014 | Ramagem et al. |

(56) References Cited

U.S. PATENT DOCUMENTS

| | | |
|---|---|---|
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0032264 A1* | 1/2015 | Emmons ............ F24F 11/0001 700/276 |
| 2015/0037992 A1 | 2/2015 | Perez, Jr. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144705 A1 | 5/2015 | Thiruvengada et al. |
| 2015/0144706 A1 | 5/2015 | Robideau et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159895 A1 | 6/2015 | Quam et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233595 A1* | 8/2015 | Fadell ..................... F24F 11/30 700/278 |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0280935 A1 | 10/2015 | Poplawski et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0345818 A1 | 12/2015 | Oh et al. |
| 2015/0345819 A1 | 12/2015 | Ostrovsky et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362927 A1 | 12/2015 | Giorgi |
| 2015/0364135 A1 | 12/2015 | Kolavennu et al. |
| 2015/0369503 A1 | 12/2015 | Flaherty et al. |
| 2015/0369507 A1 | 12/2015 | Flaherty et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0025366 A1 | 1/2016 | Snow et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |

(56) References Cited

U.S. PATENT DOCUMENTS

| | | |
|---|---|---|
| 2016/0054022 A1 | 2/2016 | Matas et al. |
| 2016/0061471 A1 | 3/2016 | Eicher et al. |
| 2016/0061474 A1 | 3/2016 | Cheung et al. |
| 2016/0069580 A1 | 3/2016 | Crisa |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0116177 A1 | 4/2016 | Sikora et al. |
| 2016/0146769 A1* | 5/2016 | Zhang ............... G01N 33/0063 73/31.02 |
| 2016/0178589 A1 | 6/2016 | Gulaguli et al. |
| 2016/0231014 A1 | 8/2016 | Ro et al. |
| 2016/0327298 A1 | 11/2016 | Sinha et al. |
| 2016/0327302 A1 | 11/2016 | Ribbich et al. |
| 2016/0327921 A1* | 11/2016 | Ribbich ................... F24F 11/30 |
| 2016/0377298 A1 | 12/2016 | Livchak et al. |
| 2016/0377306 A1 | 12/2016 | Drees et al. |
| 2017/0052545 A1 | 2/2017 | Cortez |
| 2017/0067239 A1 | 3/2017 | Dorendorf et al. |
| 2017/0130981 A1 | 5/2017 | Willette et al. |
| 2017/0136206 A1 | 5/2017 | Pillai et al. |
| 2017/0139386 A1 | 5/2017 | Pillai et al. |
| 2017/0159954 A1 | 6/2017 | Bergman et al. |
| 2017/0176030 A1 | 6/2017 | Emmons et al. |
| 2017/0176963 A1* | 6/2017 | Goli ................... G07C 9/00007 |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| DE | 10 2004 005 962 | 8/2005 |
| EP | 2 283 279 A2 | 2/2011 |
| EP | 2 897 018 A1 | 7/2015 |
| EP | 2 988 188 A2 | 2/2016 |
| GB | 2 519 441 A | 4/2015 |
| WO | WO 1995/208606 A1 | 10/1995 |
| WO | WO-00/22491 A1 | 4/2000 |
| WO | WO-2006/041599 A9 | 7/2006 |
| WO | WO-2009/006133 A1 | 1/2009 |
| WO | WO-2009/036764 A3 | 3/2009 |
| WO | WO-2009/058127 A1 | 5/2009 |
| WO | WO-2010/059143 A1 | 5/2010 |
| WO | WO-2010/078459 A1 | 7/2010 |
| WO | WO-2010/088663 A1 | 8/2010 |
| WO | WO 2017/031688 | 3/2012 |
| WO | WO-2012/042232 | 4/2012 |
| WO | WO 2012/047938 A2 | 4/2012 |
| WO | WO-2012/068436 A1 | 5/2012 |
| WO | WO-2012/068437 A3 | 5/2012 |
| WO | WO-2012/068459 A3 | 5/2012 |
| WO | WO-2012/068495 A1 | 5/2012 |
| WO | WO-2012/068503 A1 | 5/2012 |
| WO | WO-2012/068507 A3 | 5/2012 |
| WO | WO-2012/068517 A1 | 5/2012 |
| WO | WO-2012/068526 A1 | 5/2012 |
| WO | WO-2012/142477 A3 | 10/2012 |
| WO | WO-2013/033469 A1 | 3/2013 |
| WO | WO-2013/052389 A1 | 4/2013 |
| WO | WO-2013/052901 A3 | 4/2013 |
| WO | WO-2013/052905 A1 | 4/2013 |
| WO | WO-2013/058932 | 4/2013 |
| WO | WO-2013/058933 A1 | 4/2013 |
| WO | WO-2013/058934 | 4/2013 |
| WO | WO-2013/058968 A1 | 4/2013 |
| WO | WO-2013/058969 A1 | 4/2013 |
| WO | WO-2013/059684 A1 | 4/2013 |
| WO | WO-2013/153480 A3 | 10/2013 |
| WO | WO-2014/047501 A1 | 3/2014 |
| WO | WO-2014/051632 A1 | 4/2014 |
| WO | WO-2014/051635 A1 | 4/2014 |
| WO | WO-2014/055059 A1 | 4/2014 |
| WO | WO-2014/152301 A2 | 9/2014 |
| WO | WO-2014/152301 A3 | 9/2014 |
| WO | WO-2015/012449 A1 | 1/2015 |
| WO | WO-2015/039178 A1 | 3/2015 |
| WO | WO-2015/054272 A2 | 4/2015 |
| WO | WO-2015/057698 A1 | 4/2015 |
| WO | WO-2015/099721 A1 | 7/2015 |
| WO | WO-2015/127499 A1 | 9/2015 |
| WO | WO-2015/127566 A1 | 9/2015 |
| WO | WO-2015/134755 A3 | 9/2015 |
| WO | WO-2015/195772 A1 | 12/2015 |
| WO | WO-2016/038374 A1 | 3/2016 |

OTHER PUBLICATIONS

U.S. Appl. No. 15/146,202, filed May 4, 2016, Johnson Controls Technology Company.

U.S. Appl. No. 15/146,649, filed May 4, 2016, Johnson Controls Technology Company.

U.S. Appl. No. 15/146,749, filed May 4, 2016, Johnson Controls Technology Company.

U.S. Appl. No. 15/247,777, filed Aug. 25, 2016, Johnson Controls Technology Company.

U.S. Appl. No. 15/247,784, filed Aug. 25, 2016, Johnson Controls Technology Company.

U.S. Appl. No. 15/247,788, filed Aug. 25, 2016, Johnson Controls Technology Company.

U.S. Appl. No. 15/247,793, filed Aug. 25, 2016, Johnson Controls Technology Company.

U.S. Appl. No. 15/247,844, filed Aug. 25, 2016, Johnson Controls Technology Company.

U.S. Appl. No. 15/247,869, filed Aug. 25, 2016, Johnson Controls Technology Company.

U.S. Appl. No. 15/247,872, filed Aug. 25, 2016, Johnson Controls Technology Company.

U.S. Appl. No. 15/247,873, filed Aug. 25, 2016, Johnson Controls Technology Company.

U.S. Appl. No. 15/247,875, filed Aug. 25, 2016, Johnson Controls Technology Company.

U.S. Appl. No. 15/247,879, filed Aug. 25, 2016, Johnson Controls Technology Company.

U.S. Appl. No. 15/247,880, filed Aug. 25, 2016, Johnson Controls Technology Company.

U.S. Appl. No. 15/247,883, filed Aug. 25, 2016, Johnson Controls Technology Company.

U.S. Appl. No. 15/247,885, filed Aug. 25, 2016, Johnson Controls Technology Company.

U.S. Appl. No. 15/247,886, filed Aug. 25, 2016, Johnson Controls Technology Company.

U.S. Appl. No. 15/338,215, filed Oct. 28, 2016, Johnson Controls Technology Company.

U.S. Appl. No. 15/338,221, filed Oct. 28, 2016, Johnson Controls Technology Company.

U.S. Appl. No. 29/548,334, filed Dec. 11, 2015, Johnson Controls Technology Company.

U.S. Appl. No. 29/563,447, filed May 4, 2016, Johnson Controls Technology Company.

U.S. Appl. No. 29/576,515, filed Sep. 2, 2016, Johnson Controls Technology Company.

U.S. Appl. No. 62/239,131, filed Oct. 8, 2015, Johnson Controls Technology Company.

U.S. Appl. No. 62/239,231, filed Oct. 8, 2015, Johnson Controls Technology Company.

U.S. Appl. No. 62/239,233, filed Oct. 8, 2015, Johnson Controls Technology Company.

U.S. Appl. No. 62/239,245, filed Oct. 8, 2015, Johnson Controls Technology Company.

U.S. Appl. No. 62/239,246, filed Oct. 8, 2015, Johnson Controls Technology Company.

(56) References Cited

OTHER PUBLICATIONS

U.S. Appl. No. 62/239,249, filed Oct. 8, 2015, Johnson Controls Technology Company.
International Search Report and Written Opinion for Application No. PCT/US2016/030291, dated Sep. 7, 2016, 11 pages.
International Search Report and Written Opinion for Application No. PCT/US2016/030827, dated Sep. 7, 2016, 13 pages.
International Search Report and Written Opinion for Application No. PCT/US2016/030829, dated Sep. 7, 2016, 15 pages.
International Search Report and Written Opinion for Application No. PCT/US2016/030835, dated Sep. 7, 2016, 13 pages.
International Search Report and Written Opinion for Application No. PCT/US2016/030836, dated Sep. 7, 2016, 11 pages.
International Search Report and Written Opinion for Application No. PCT/US2016/030837, dated Sep. 7, 2016, 13 pages.
Search Report for International Application No. PCT/US2018/024833, dated Aug. 31, 2018, 11 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.

* cited by examiner

MULTI-FUNCTION THERMOSTAT WITH AIR QUALITY DISPLAY

CROSS-REFERENCE TO RELATED PATENT APPLICATION

This application claims the benefit of and priority to U.S. Provisional Patent Application No. 62/485,789 filed Apr. 14, 2017, the entire disclosure of which is incorporated by reference herein.

BACKGROUND

The present disclosure relates generally to multi-function thermostats for use in monitoring and controlling a building management system or a building space. The present disclosure relates more particularly to optimizing air quality in a building space by communicating critical air quality information and adjusting equipment in a heating, ventilating, and air conditioning (HVAC) system using the multi-function thermostat.

A thermostat is, in general, a component of an HVAC control system. Traditional thermostats sense the temperature of a system and control components of the HVAC in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature of a building or space, a user adjusts the setpoint via the thermostat's user interface.

While some thermostats in HVAC control systems can display air quality data, many users may find the data to be of little practical use. For example, a user may not recognize the significance or insignificance of the air quality data, and may not recognize whether a corrective or mitigation action should be implemented to improve air quality.

SUMMARY

One implementation of the present disclosure is an HVAC system within a building including one or more sensors and a thermostat. The thermostat has a processor that is configured to receive air quality information relating to one or more air quality components. The thermostat is further configured to determine a performance level corresponding to each air quality component. The thermostat is further configured to determine one or more parameter values for each air quality component. The thermostat is further configured to generate an icon that visually represents each air quality component.

In some embodiments, the one or more air quality components include one or more of a volatile organic compound (VOC) level, a carbon monoxide level, a carbon dioxide level, a temperature measurement, and a humidity level.

In some embodiments, the one or more icon parameter values include a color parameter with parameter values corresponding to a set of colors, whereby each color in the set indicates a performance level.

In some embodiments, the one or more icon parameter values include a size parameter with parameter values corresponding to a set of icon sizes, whereby each icon size in the set indicates a performance level.

In some embodiments, the one or more icon parameter values include a placement parameter with parameter values corresponding to a set of icon placement locations, whereby each icon placement location in the set indicates a performance level.

In some embodiments, the processor is further configured to determine a corrective action associated with a performance level of an air quality component, wherein the corrective action represents an action for improving the performance level of the air quality component, and generate a mitigation icon based on the determined corrective action.

In some embodiments, the corrective action includes one or more of the following: opening a window, closing a window, controlling a fan, controlling a humidifier, controlling an electronic air cleanser, and performing maintenance of an HVAC device or appliance.

In some embodiments, the set of colors includes green, yellow, and red.

In some embodiments, green indicates high performance level of the air quality component, yellow indicates moderate performance of the air quality component, and red indicates poor or unhealthy performance of the air quality component.

In some embodiments, increasing icon size indicates decreasing performance level.

Another implementation of the present disclosure is a method of providing visual indications of air quality via a thermostat of an HVAC system within a building. The method includes measuring, by one or more sensors of the HVAC system, air quality within the building. The method further includes receiving, by the thermostat, air quality information relating to one or more air quality components from the one or more sensors. The method further includes determining, by the thermostat, a performance level corresponding to each air quality component. The method further includes determining, by the thermostat, one or more icon parameter values for each air quality component based on the corresponding performance level. The method further includes generating, by the thermostat, one or more icons that visually represent each air quality component based on the corresponding icon parameter values.

In some embodiments, the one or more air quality components include one or more of a volatile organic compound (VOC) level, a carbon monoxide level, a carbon dioxide level, a temperature measurement, and a humidity level.

In some embodiments, the one or more icon parameter values include a color parameter with parameter values corresponding to a set of colors, whereby each color in the set indicates a performance level.

In some embodiments, the one or more icon parameter values include a size parameter with parameter values corresponding to a set of icon sizes, whereby each icon size in the set indicates a performance level.

In some embodiments, the icon parameters include a placement parameter with parameter values corresponding to a set of icon placement locations, whereby each icon placement location in the set indicates a performance level.

In some embodiments, the method further includes determining a corrective action associated with a performance level of an air quality component, wherein the corrective action represents an action for improving the performance level of the air quality component, and generating a mitigation icon based on the determined corrective action.

In some embodiments, the corrective action includes one or more of the following: opening a window, closing a window, controlling a fan, controlling a humidifier, controlling an electronic air cleanser, and performing maintenance of an HVAC device or appliance.

In some embodiments, the set of colors includes green, yellow, and red.

In some embodiments, green indicates high performance level of the air quality component, yellow indicates moderate performance of the air quality component, and red indicates poor or unhealthy performance of the air quality component.

In some embodiments, increasing icon size indicates decreasing performance level.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a user control device is shown, according to some embodiments. The user control device described herein may be a thermostat used in any HVAC system, room, environment, or system within which it is desired to control and/or observe environmental conditions (e.g., temperature, humidity, etc.). In traditional HVAC systems, a thermostat may be adjusted by a user to control the temperature of a system.

The user control device is intended to provide the user with an ability to function as a connected smart hub. The thermostat provides a desirable user interface for other environmental controls because of its known fixed location within a space. The user control device is intended to be more personal, more efficient, and more aware than traditional thermostats.

The user control device collects data about a space and the occupants of the space with various sensors (e.g., temperature sensors, humidity sensors, acoustic sensors, optical sensors, gas and other chemical sensors, biometric sensors, motion sensors, etc.) and user inputs. The user control device may utilize data collected from a single room, multiple rooms, an entire building, or multiple buildings. The data may be analyzed locally by the user control device or may be uploaded to a remote computing system and/or the cloud for further analysis and processing.

Building Management System and HVAC System

Figure 1:
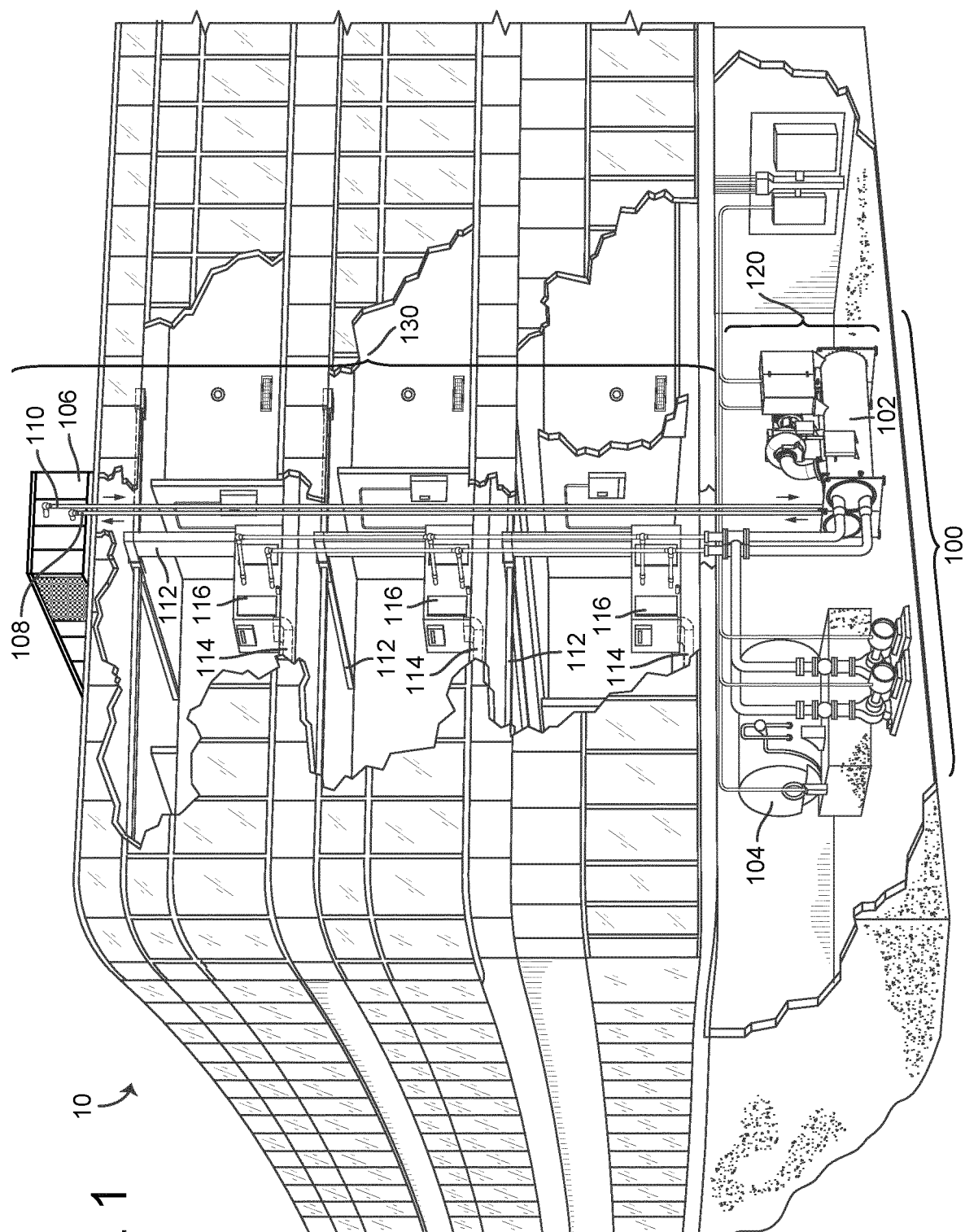
FIG. 1 is a drawing of a building equipped with a HVAC system, according to embodiments.

Referring now to FIGS. 1-4, a building management system (BMS) and HVAC system in which the systems and methods of the present disclosure may be implemented are shown, according to an embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. A waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
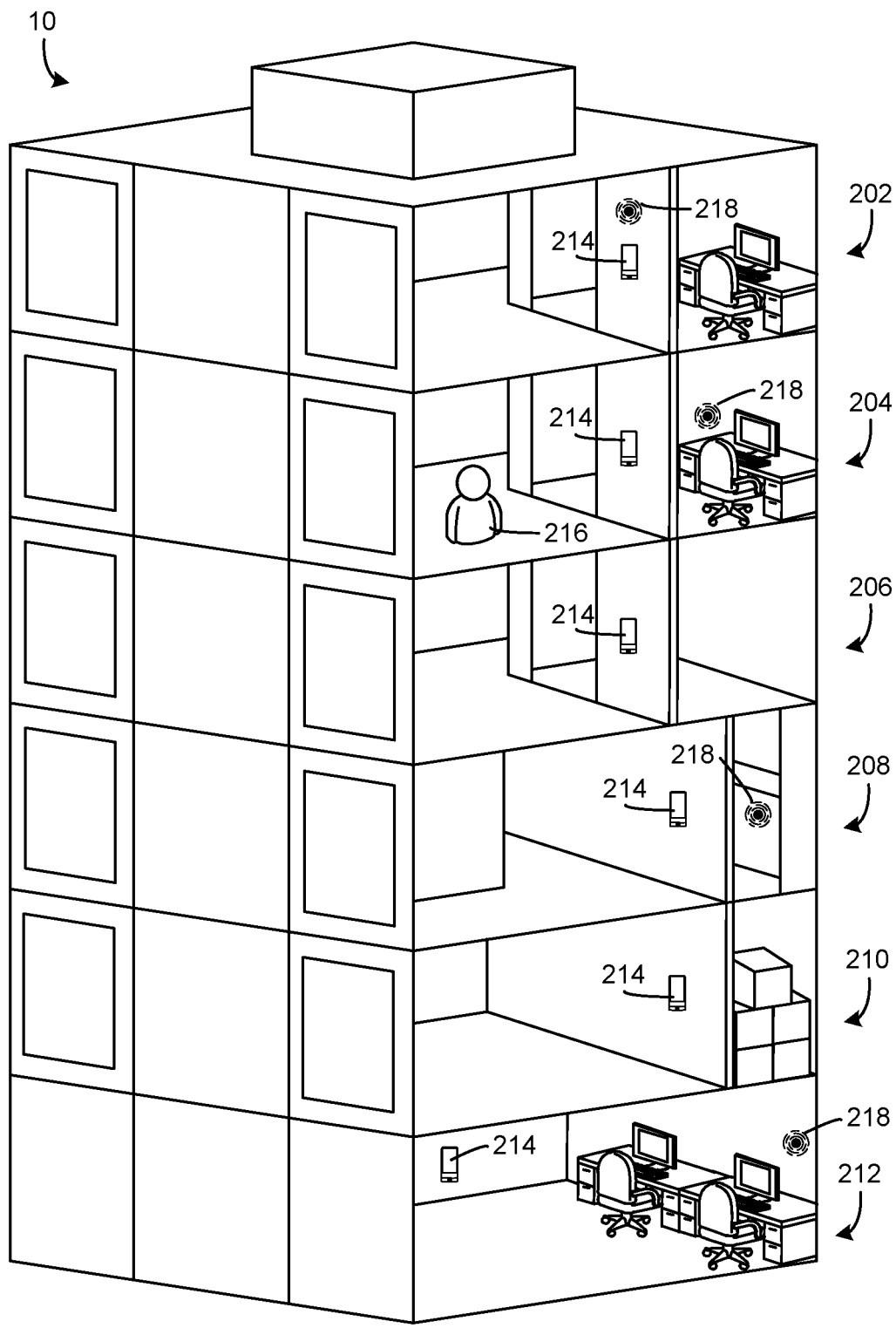
FIG. 2 is a drawing of multiple zones and floors of the building of FIG. 1 equipped with control devices, according to embodiments.

Referring now to FIG. 2, building 10 is shown in greater detail, according to an embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heart-rates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a ZigBee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine what zone the occupant is in. In some embodiments, control device 214 causes temperature setpoints, music and/or other control actions to follow occupant 216 as the occupant 216 moves from one zone to another zone (i.e., from one floor to another floor).

In some embodiments, display devices 214 are connected to a building management system, a weather server, and/or a building emergency sensor(s). In some embodiments, display devices 214 may receive emergency notifications from the building management system, the weather server, and/or the building emergency sensor(s). Based on the nature of the emergency, display devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If display devices 214 determines that there are high winds around building 10, the control device 214 may direct occupants of zones 202-210 to zone 212 if zone 212 has no windows.

Figure 3:
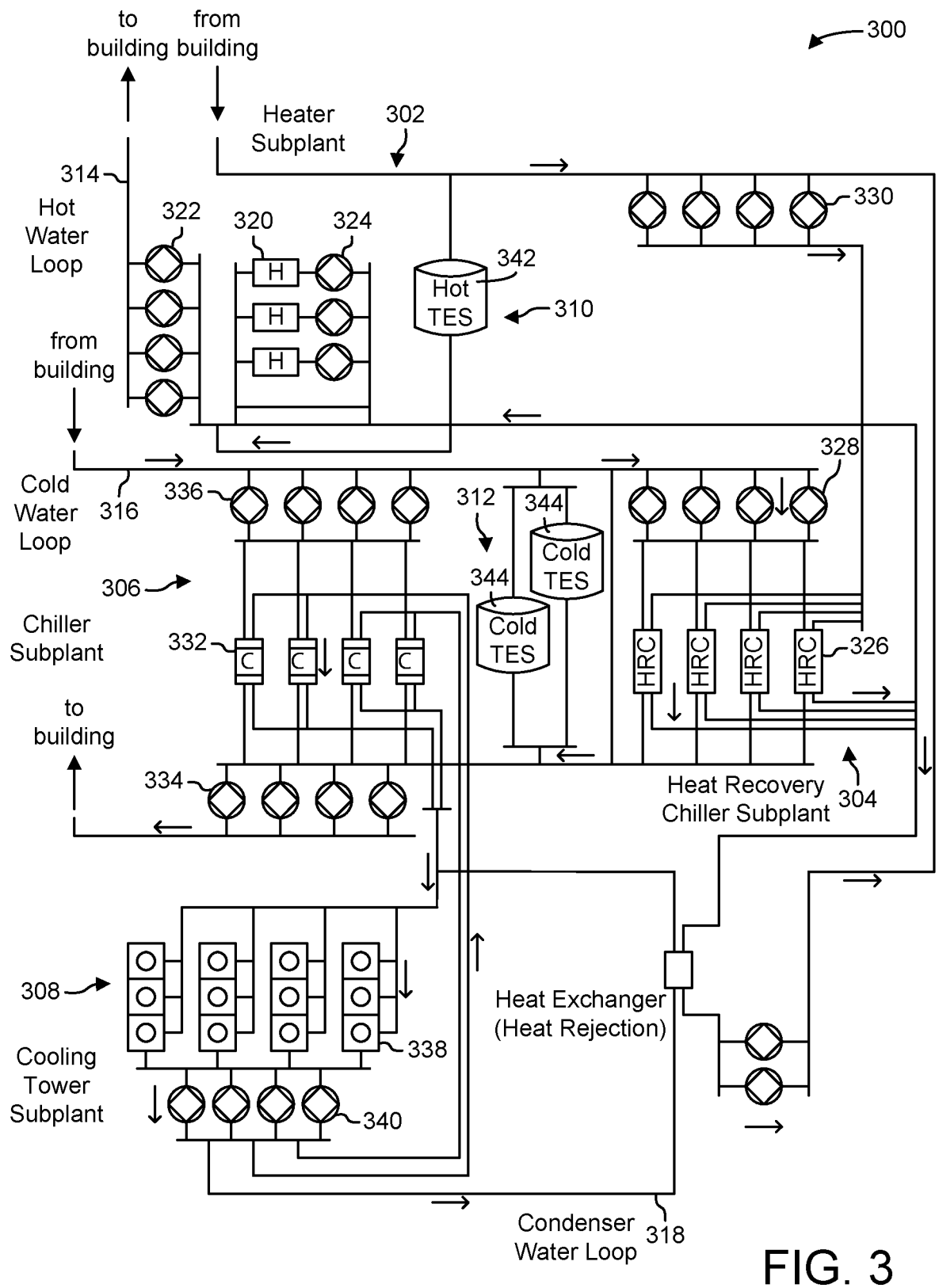
FIG. 3 is a block diagram of a waterside system that may be used in conjunction with the building of FIGS. 1-2, according to embodiments.

Referring now to FIG. 3, a block diagram of a waterside system 300 is shown, according to an embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
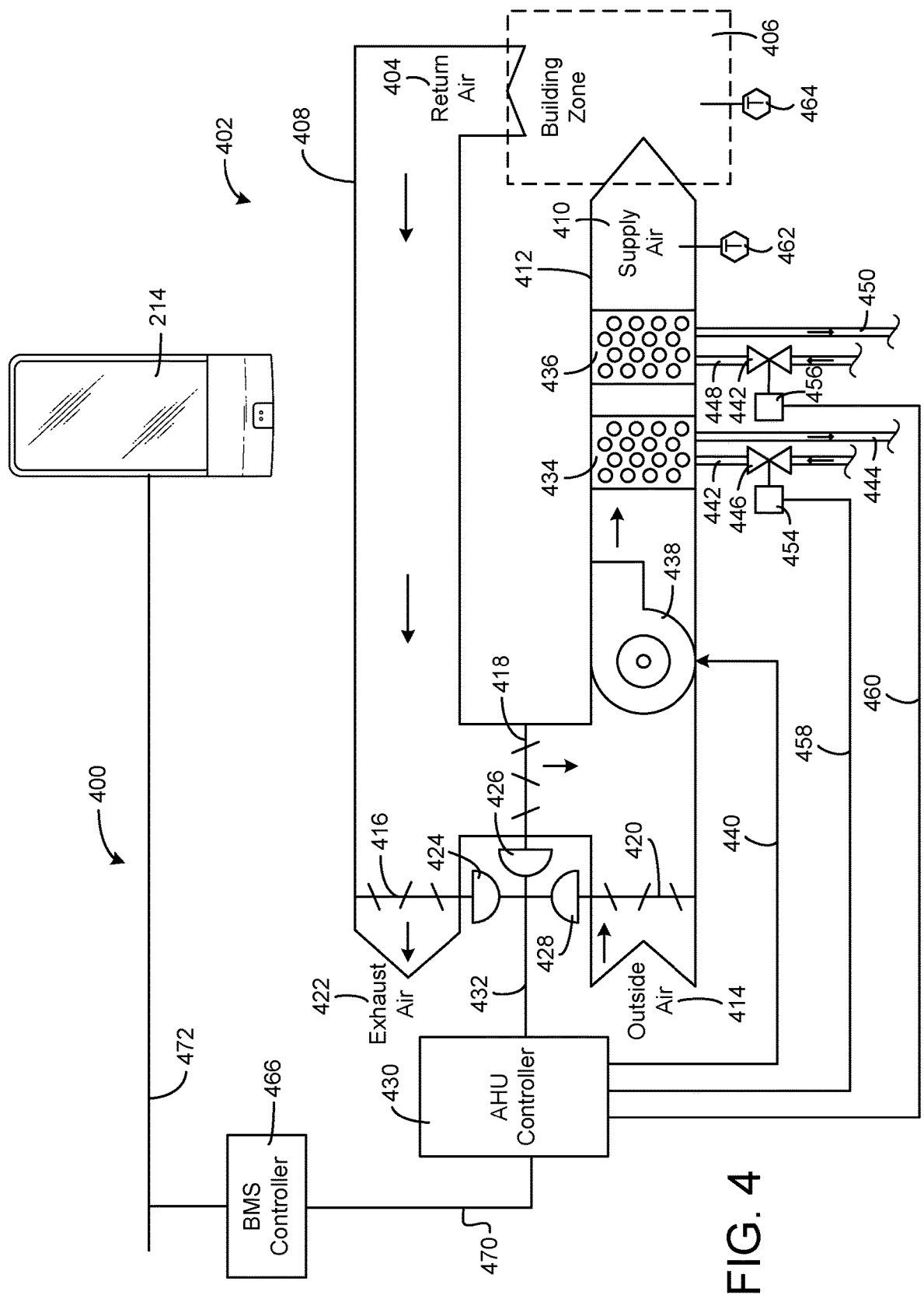
FIG. 4 is a block diagram of an airside system that may be used in conjunction with the building of FIGS. 1-2, according to embodiments.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 612. In some embodiments, AHU 402 is a rooftop unit located on the roof of building 10 (e.g., AHU 4506 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 612. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 612 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472.

Figure 5:
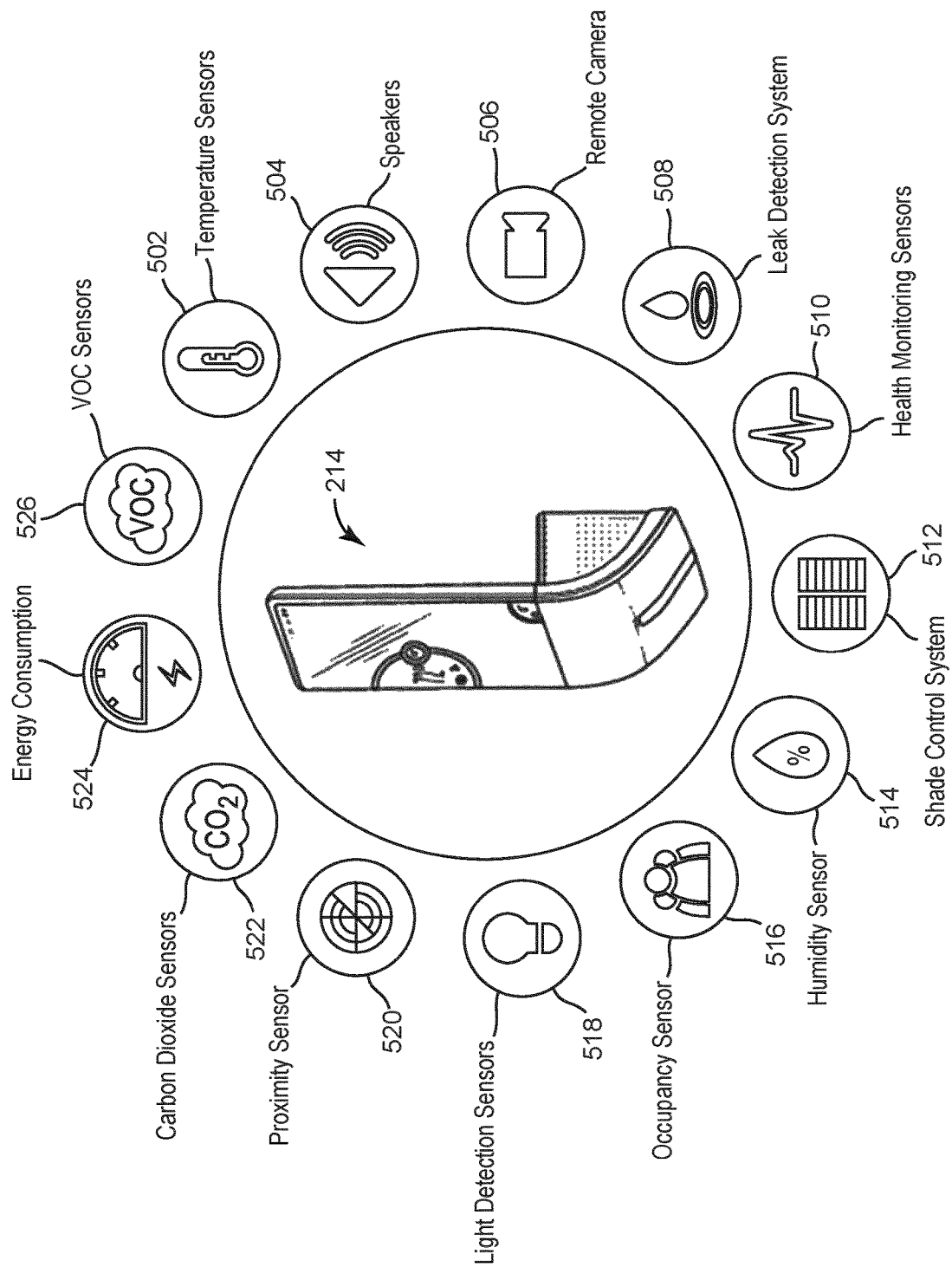
FIG. 5 is a drawing of the connections of the control device of FIG. 2 and FIG. 4, according to embodiments.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, light detection sensors 518, proximity sensor 520, carbon dioxide sensors 522, energy consumption sensors 524, volatile organic compound (VOC) sensors 526, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, the temperature sensors 502, the humidity sensors 514, the carbon dioxide sensors 522, and the VOC sensors 526 may be located at different locations within a building or home. Additionally, one or more of the temperature sensors 502, the humidity sensors 514, the carbon dioxide sensors 522, and the VOC sensors 526 may be located outside of the building or home to measure aspects of the outside air, such as outdoor temperature, outdoor humidity, carbon dioxide levels and VOC levels in the outside air. In further embodiments, the control device 214 may communicate with sensors both inside the building or home as well as outside the building or home.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, an HVAC system, or any of a variety of other external systems or devices which may be used in a home automation system or a building automation system. Control device 214 may provide a variety of monitoring and control interfaces to allow a user to control all of the systems and devices connected to control device 214. Embodiments of user interfaces and features of control device 214 are described in greater detail below.

Figure 6:
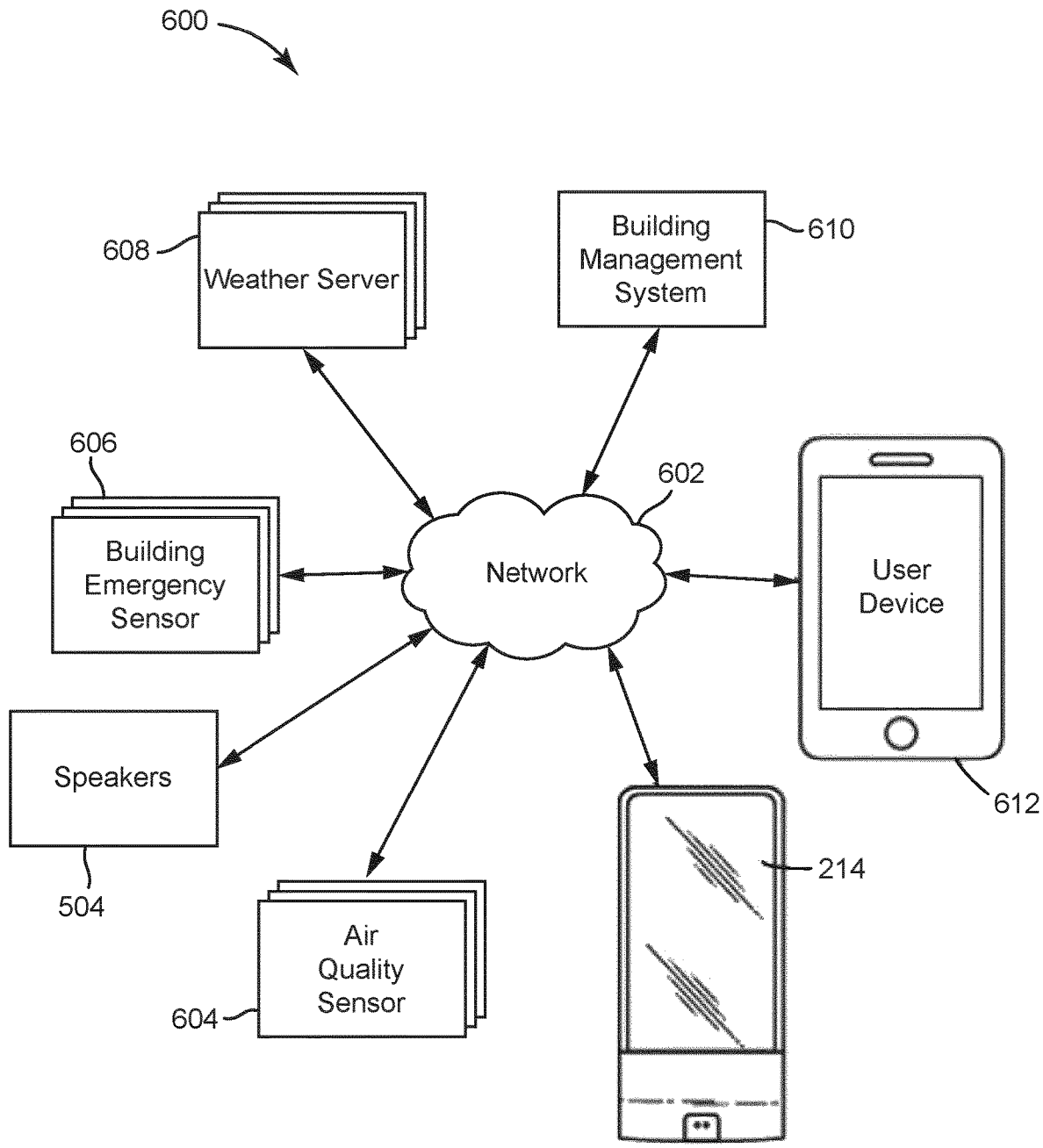
FIG. 6 is a diagram of a communications system located in the building of FIGS. 1 and 2, according to embodiments.

Referring now to FIG. 6, a block diagram of communications system 600 is shown, according to some embodiments. System 600 can be implemented in a building (e.g. building 10) and is shown to include control device 214, network 602, air quality sensors 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, air quality information, and any other information via network 602. In some embodiments, the information is received from building management system 610 via network 602. In various embodiments, the information is received from the Internet via network 602. In some embodiments, control device 214 is at least one of, or a combination of, a thermostat, a humidistat, a light controller, and any other wall mounted and/or hand held device. In some embodiments, the control device 214 is connected to one or more air quality sensors 604. Air quality sensors 604 can include temperature sensors, humidity sensors, carbon dioxide sensors, VOC sensors, etc. In some embodiments, control device 214 is connected to building emergency sensor(s) 606. In some embodiments, building emergency sensor(s) 406 are sensors which detect building emergencies. Building emergency sensor(s) 406 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five day forecast, thirty day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency. In further embodiments, the weather server(s) 608 may be configured to provide air quality information to the control device 214. For example, the weather server(s) 608 may provide air quality information such as pollen levels, mold levels, particulate levels, etc.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In further embodiments, the building management system 610 may be configured to control one or more fans or ventilators to provide air flow into and out of a building (e.g. building 10). In some embodiments, building management system 610 may be configured to control the lighting of a building. In some embodiments, building management system 610 may be configured to transmit emergency information to control device 214. In some embodiments, the emergency information is a notification of an active shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 is configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into calendar application 614. In some embodiments, calendar application 414 is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

Air Quality Display

Figure 7:
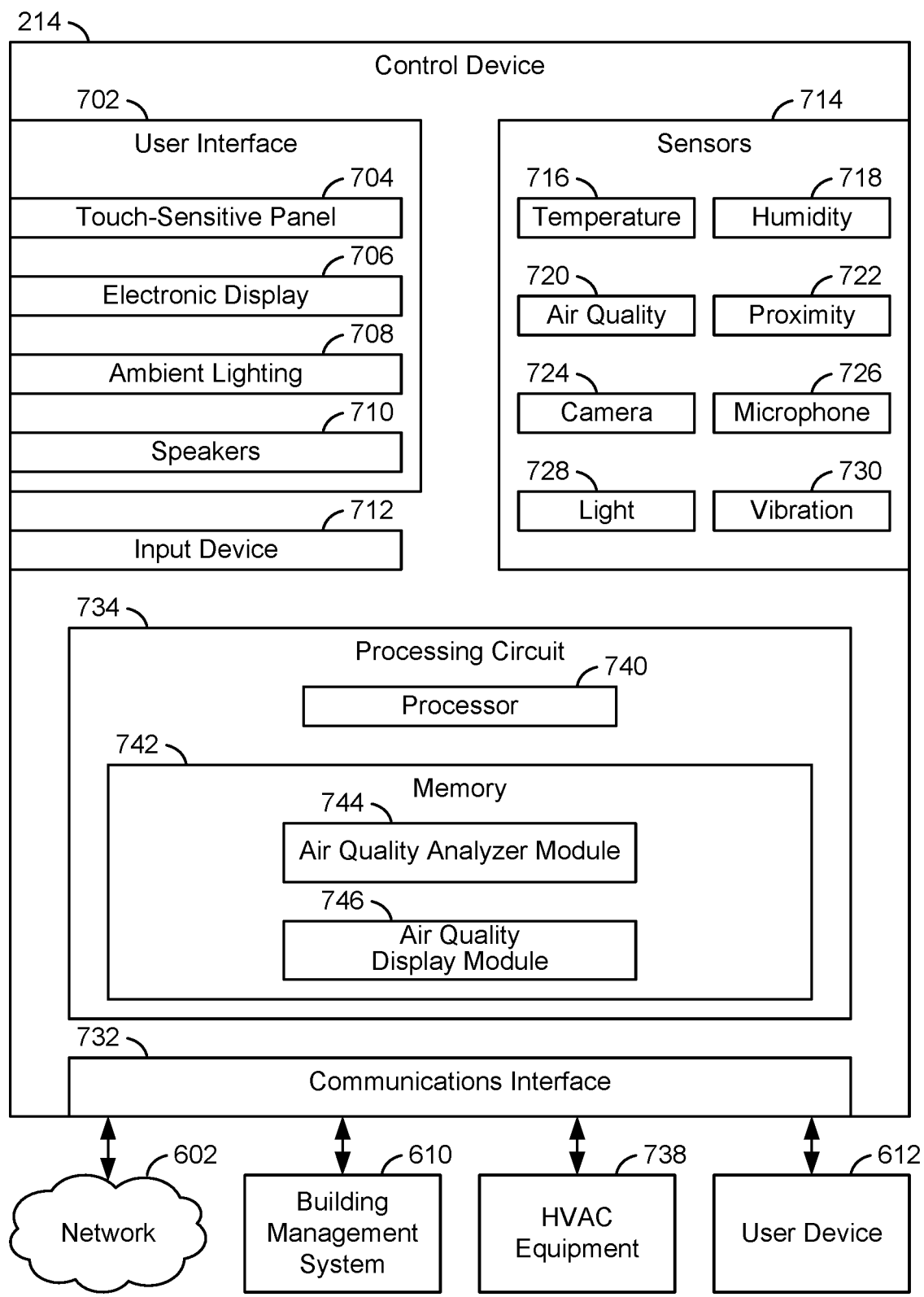
FIG. 7 is a block diagram illustrating the control device of FIGS. 2, 3, and 5 in greater detail, according to embodiments.

Referring now to FIG. 7, a block diagram illustrating control device 214 in greater detail is shown, according to some embodiments. Control device 214 is shown to include a variety of user interface devices 702. User interface devices 702 may be configured to receive input from a user and provide output to a user in various forms. For example, user interface devices 702 are shown to include a touch-sensitive panel 704, an electronic display 706, ambient lighting 708, speakers 710 (e.g., speakers 504), and an input device 712. Input device 712 may include a microphone configured to receive voice commands from a user, a keyboard or buttons, switches, dials, or any other user-operable input device. It is contemplated that user interface devices 702 may include any type of device configured to receive input from a user and/or provide an output to a user in any of a variety of forms (e.g., touch, text, video, graphics, audio, vibration, etc.).

Touch-sensitive panel 704 may be a touchscreen or other type of electronic display configured to present information to a user in a visual format (e.g., daily schedule, text, graphics, etc.) and receive input from a user (e.g., via a touch-sensitive panel). For example, touch sensitive panel 704 may include a touch-sensitive panel layered on top of an electronic visual display. A user can provide inputs through simple or multi-touch gestures by touching panel 704 with one or more fingers and/or with a stylus or pen. Touch-sensitive panel 704 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 706 allowing registration of touch in two or even more locations at once. Display 706 may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 706 is configured to present visual media (e.g., text, graphics, etc.) without requiring a backlight.

Control device 214 may also include, or be in communication with, a number of sensors 714. Sensors 714 may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. Air quality sensor 720 may be configured to measure any of a variety of air quality variables such as oxygen level, carbon dioxide level, carbon monoxide level, allergens, pollutants, smoke, VOCs, etc.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.). For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein. For example, memory 742 is shown to include an air quality analyzer module 744 and an air quality display module 746. However, other modules, such as voice command and control modules, building modules, payment modules, hotel modules, healthcare modules, occupancy modules, emergency modules and the like may also be included in the memory 742. The functions of some of these modules are described in greater detail below.

Figure 8:
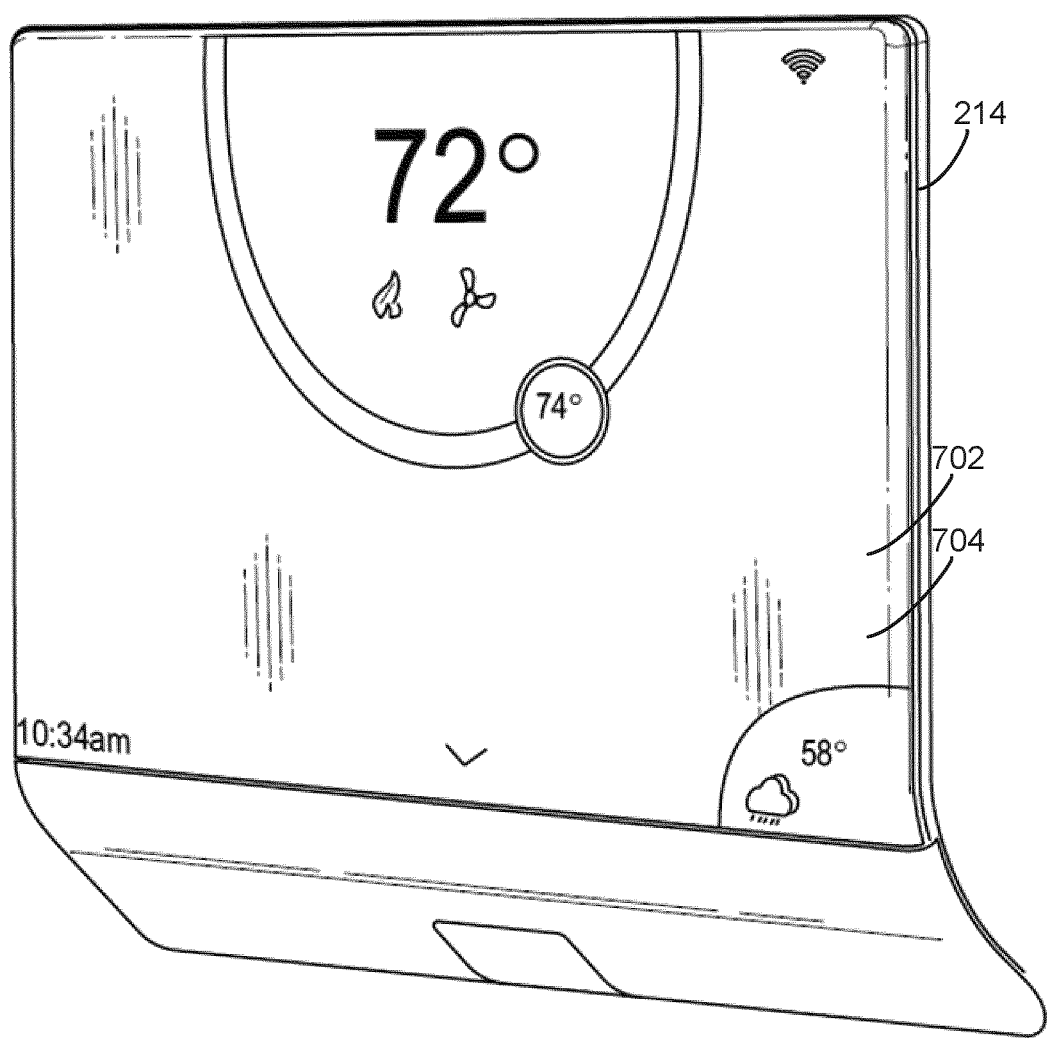
FIG. 8 is a drawing of a multi-function thermostat with a touch-screen display, according to some embodiments.

Referring to FIG. 8, one embodiment of a multi-function control device 214 is shown. Control device 214 is shown to include user interface 702, which can include touch-sensitive panel 704 and electronic display 706. Control device 214 with user interface 702 is generally configured to display a set of air quality icons based on air quality information of building 10. In some embodiments, air quality information includes measurement information received from sensors 714 (e.g. air quality sensors 720) located at various locations throughout building 10. Air quality information can be associated with one or more air quality components. Examples of air quality components include a volatile organic compound (VOC) level, a carbon monoxide level, a carbon dioxide level, a temperature measurement, a humidity level measurement, and the like.

In some embodiments, an air quality icon is provided for each air quality component. Each air quality icon can be displayed on user interface 702 and visually adapted according to a set of icon parameters. Examples of icon parameters include color, size, and placement within the electronic display 706. In this regard, a value for an icon parameter can correspond to a performance level of the air quality component.

In an example embodiment, building 10 can include sensors 720 to measure a VOC level, and sensors 720 can transmit the measurement information to control device 214 using control signals. User interface 702 of control device 214 can use the received measurement information to determine a performance level corresponding to a VOC air quality component. A VOC icon can be visually adapted for display on user interface 702 according to icon parameter values, whereby the icon parameter values are based on the determined performance level. One icon parameter can be icon color. If received measurement information indicates a high VOC performance level, an icon color parameter value can correspond to a green color. If received measurement information indicates a low VOC performance level, the icon color parameter value can correspond to a red color. The VOC icon is then visually adapted for display on user interface 702 according to the icon parameter value.

Figure 9:
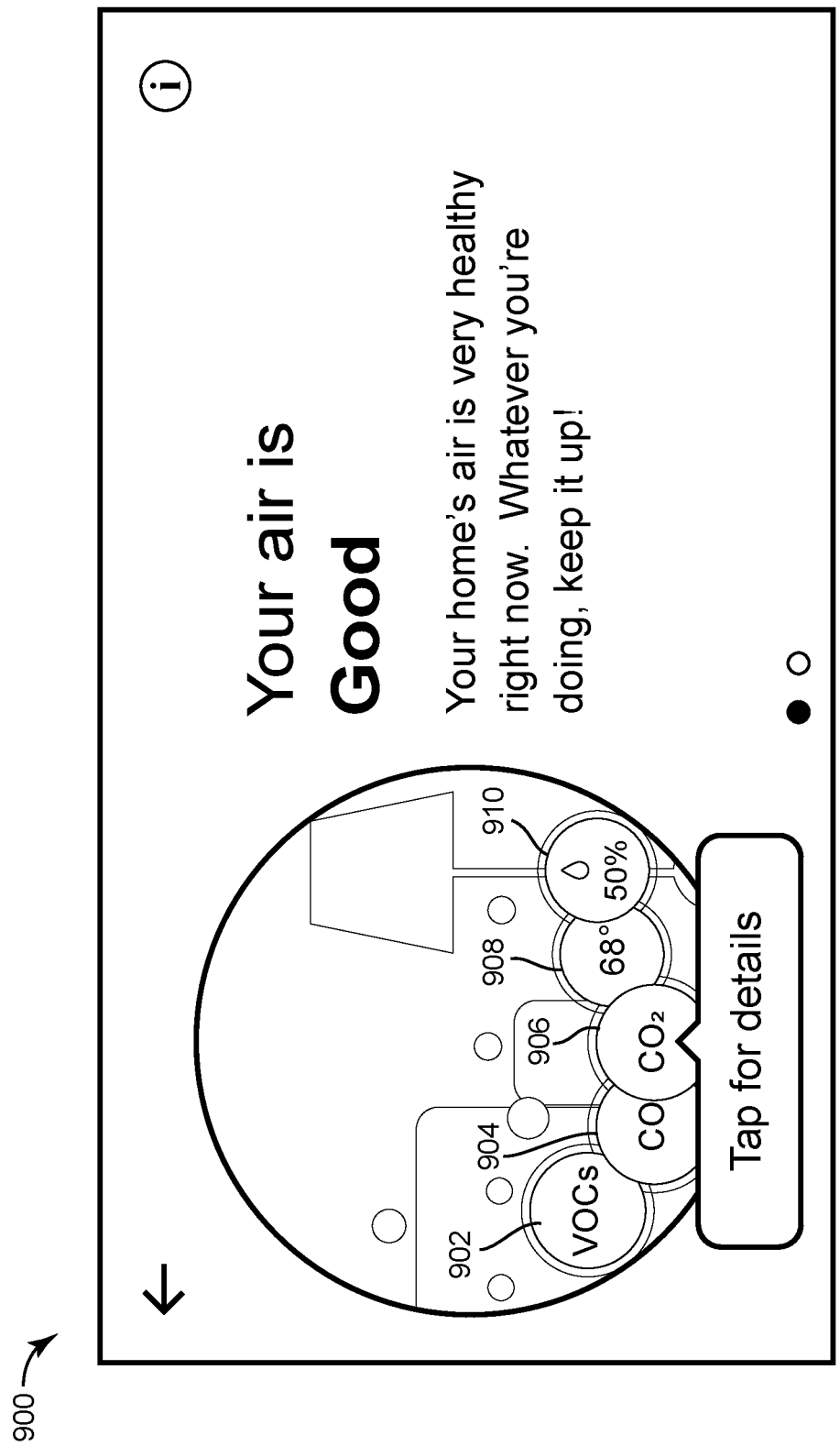
FIG. 9 is a user interface illustrating an air quality display displayed on the multi-function thermostat of FIGS. 7-8, according to some embodiments.

Referring to FIG. 9, a user interface 900 of control device 214 shows an example set of air quality icons displayed on user interface 702 of control device 214. Control device 214 is configured to receive air quality measurement information to determine a performance level for each of five air quality components: VOC, carbon monoxide, carbon dioxide, temperature, and humidity. The performance level for each air quality component is visually represented with a corresponding air quality icon, whereby the air quality icon is visually adapted according to icon parameters values, as described below.

User interface 900 includes a VOC icon 902, a carbon monoxide icon 904, a carbon dioxide icon 906, a temperature icon 908, and a humidity icon 910. Each of the icons 902-910 is visually represented according to three parameters: color, size, and placement. The color parameter can be configured such that a high performance level (i.e. good air quality) is represented by a green color, a moderate performance level is represented by a yellow color, and a poor performance level is represented by a red color. The size parameter can be configured such that a high performance level is represented by a small icon size, a moderate performance level is represented by a medium icon size, and a poor performance level is represented by a large icon size. The placement parameter can be configured such that a high performance level is represented by placing a corresponding icon in a bottom location of user interface 702, a moderate performance level is represented by placing the icon in a middle location of user interface 702, and a poor performance level is represented by placing the icon in an upward location of user interface 702.

Still referring to FIG. 9, user interface 900 shows each icon 902-910 has a color parameter represented by a green color because measurement information associated with each air quality component of icons 902-910 indicates a high performance level. Similarly, each icon 902-910 has a size parameter represented by a small icon size and a placement parameter represented by a bottom location within user interface 702. In this regard, a user can easily see a performance level of each air quality component (i.e. VOC, carbon monoxide, carbon dioxide, temperature, and humidity) by its corresponding air quality icon.

In some embodiments, user interface 702 additionally includes text, pictures, and/or touch-sensitive buttons for facilitating functions of control device 214. Any combination of text, pictures, and touch-sensitive buttons can be provided. For example, user interface 900 is shown to include text indicating an air quality summary and a touch-sensitive button. In some embodiments, the touch-sensitive button may allow the user to selectively access additional details relating to an air quality icon. In this regard, control device 214 can be configured to receive a tap gesture using touch-sensitive panel 704 of user interface 702.

Figure 10A:
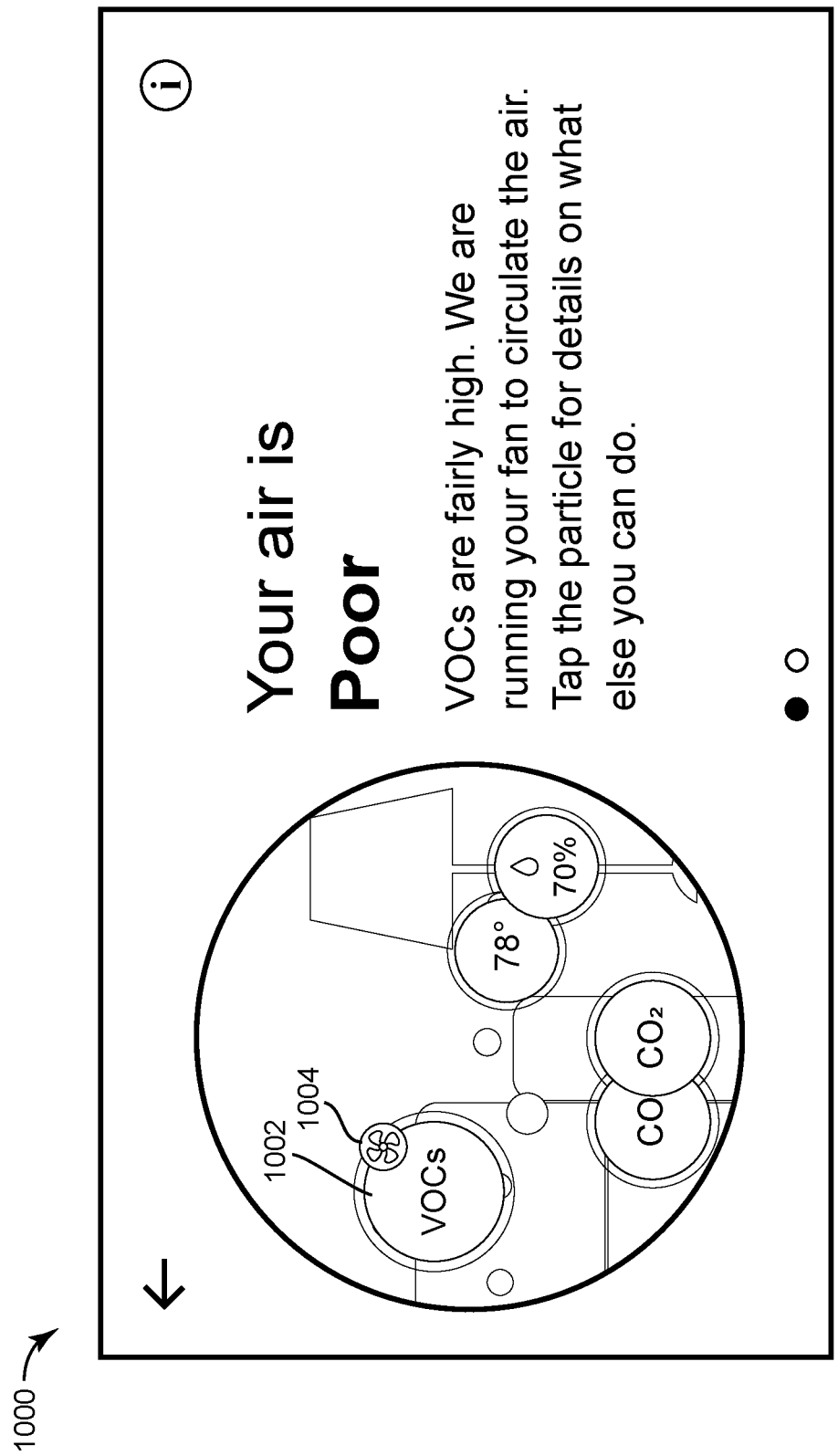
FIG. 10A is another user interface illustrating an air quality display displayed on the multi-function thermostat of FIGS. 7-8, according to some embodiments.
Figure 10B:
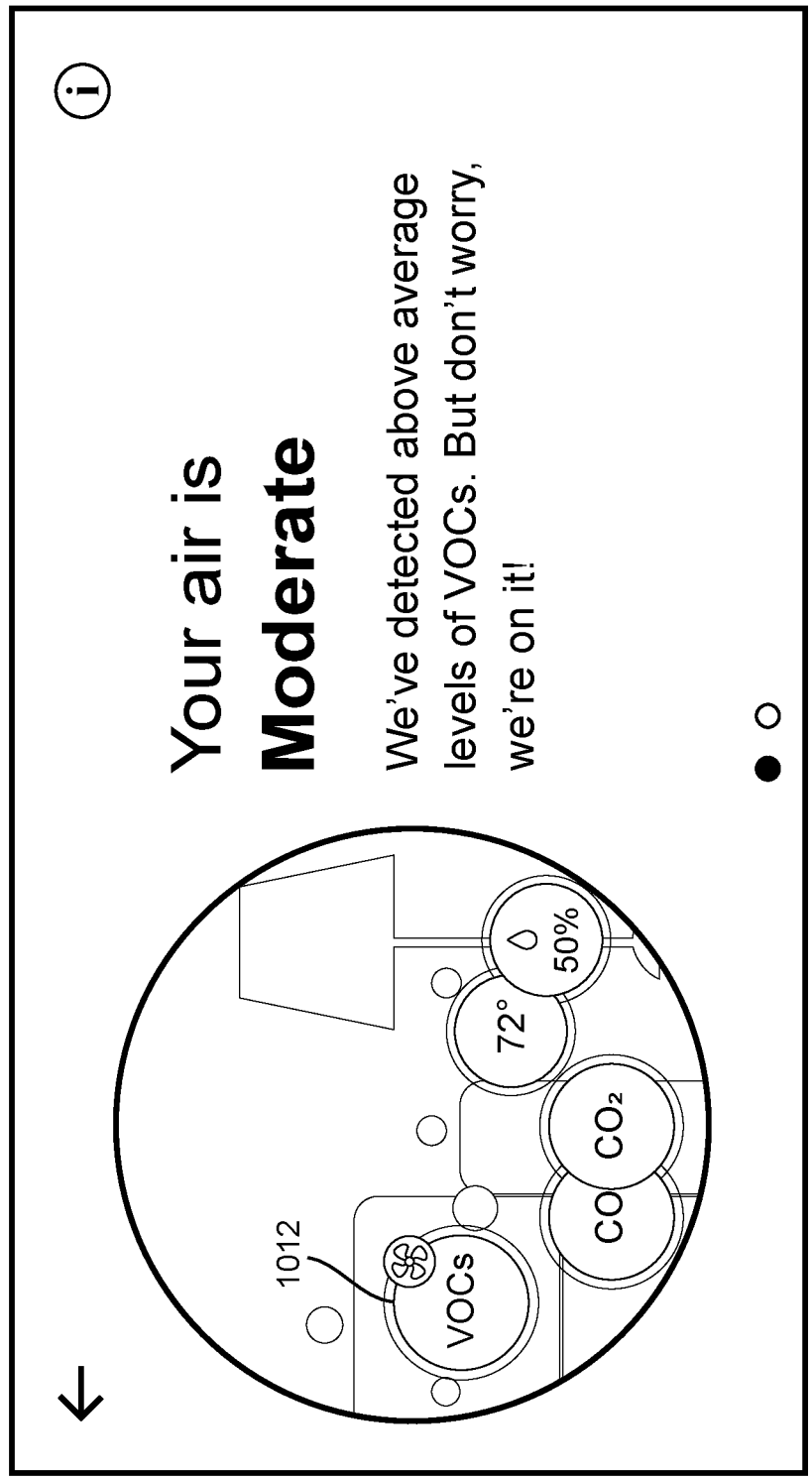
FIG. 10B is another user interface illustrating an air quality display displayed on the multi-function thermostat of FIGS. 7-8, according to some embodiments.
Figure 10C:
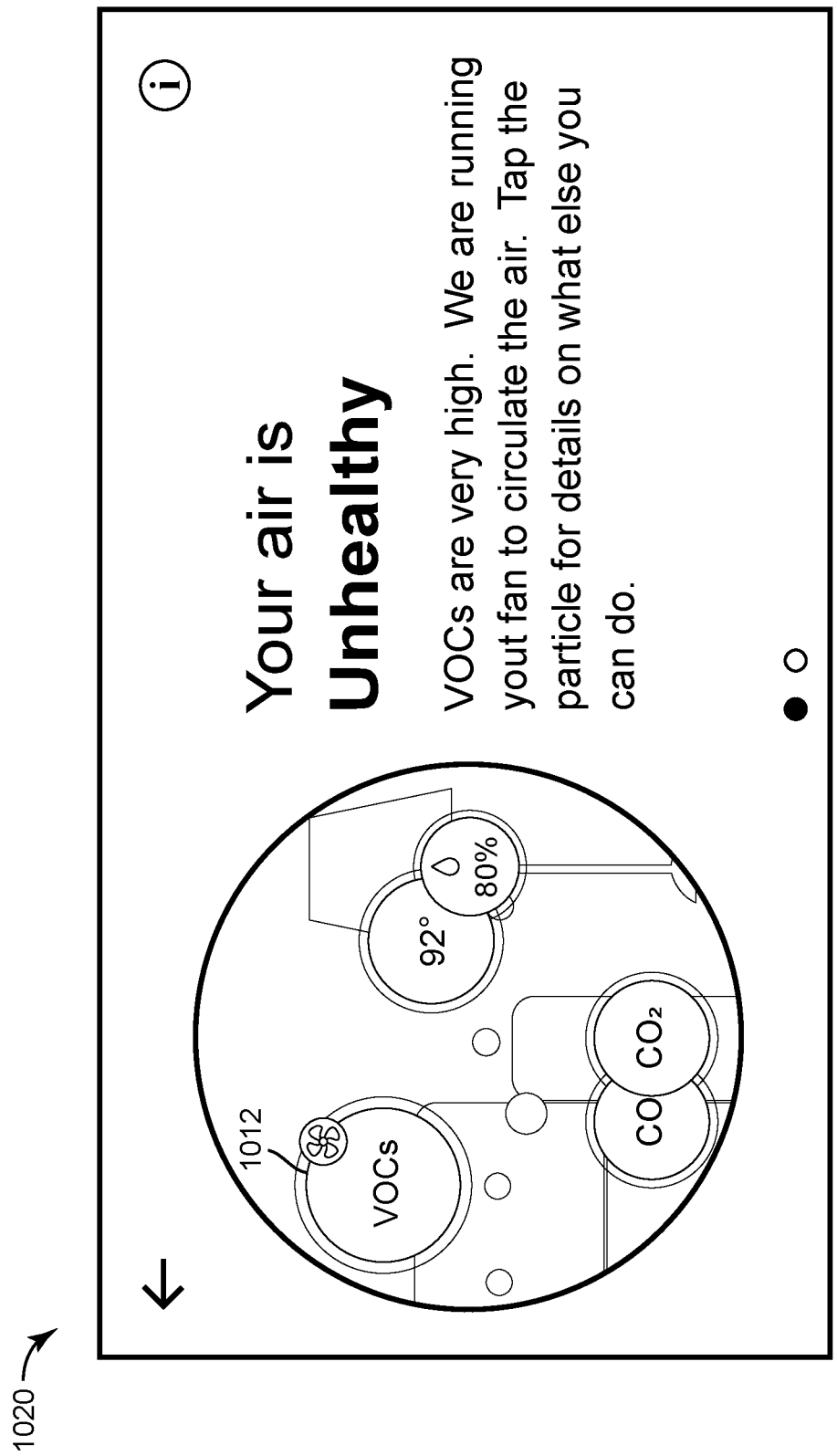
FIG. 10C is another user interface illustrating an air quality display displayed on the multi-function thermostat of FIGS. 7-8, according to some embodiments.

Referring to FIGS. 10A, 10B, and 10C, user interfaces of control device 214 are provided showing possible combinations of text, pictures, and touch-sensitive buttons of user interface 702, according some embodiments. User interface 1000 of FIG. 10A shows another example set of air quality icons that includes a VOC icon 1002 and a mitigation icon 1004. In some embodiments, the mitigation icon 1004 can visually represent a corrective action associated with a performance level of an air quality component. Corrective actions can include controlling a fan, controlling a humidifier, controlling a ventilator, activating an exhaust fan, modifying environmental setpoints, and the like. In some embodiments, control device 214 can be configured to initiate a corrective action. For example, user interface 1000 shows a poor VOC performance level as indicated by icon parameter values (color, size, and location) of VOC icon 1002. User interface 100 shows control device 214 initiating a corrective action of increasing a speed of a fan (e.g. HVAC equipment 738), as visually indicated by mitigation icon 1004. User interface 702 of control device 214 visually indicates the corrective action represented by mitigation icon 1004 is associated with a VOC performance level by laying a portion of mitigation icon 1004 over a portion of VOC icon 1002. In this regard, a user can easily see the association between mitigation icon 1004 and VOC icon 1002. User interface 1000 of control device 214 is shown to also include text for visually indicating a poor air quality summary and text describing a corrective action. In embodiments, any combination of text, pictures, and touch-sensitive buttons can be provided.

For example, referring to FIG. 10B, user interface 1010 is provided showing another possible combination of text, pictures, and touch-sensitive buttons. User interface 1010 includes VOC icon 1012 visually indicating a moderate performance level of a VOC component. In this regard, a color parameter value of VOC icon 1012 corresponds to a yellow color. A size parameter value of VOC icon 1012 corresponds to a medium icon size. A placement location value of VOC icon 1012 corresponds to a middle location of user interface 702. User interface 1010 also includes text visually indicating a moderate air quality summary.

Referring to FIG. 10C, user interface 1020 is provided showing another example of possible combinations of text, pictures, and touch-sensitive buttons. User interface 1020 includes VOC icon 1022 visually indicating an unhealthy performance level of a VOC component. In this regard, color parameter value of VOC icon 1022 corresponds to a red color. A size parameter value of VOC icon 1022 corresponds to a large icon size. A placement location value of VOC icon 1022 corresponds to a upward location of user interface 702. User interface 1020 also includes text visually indicating an unhealthy air quality summary.

Figure 11:
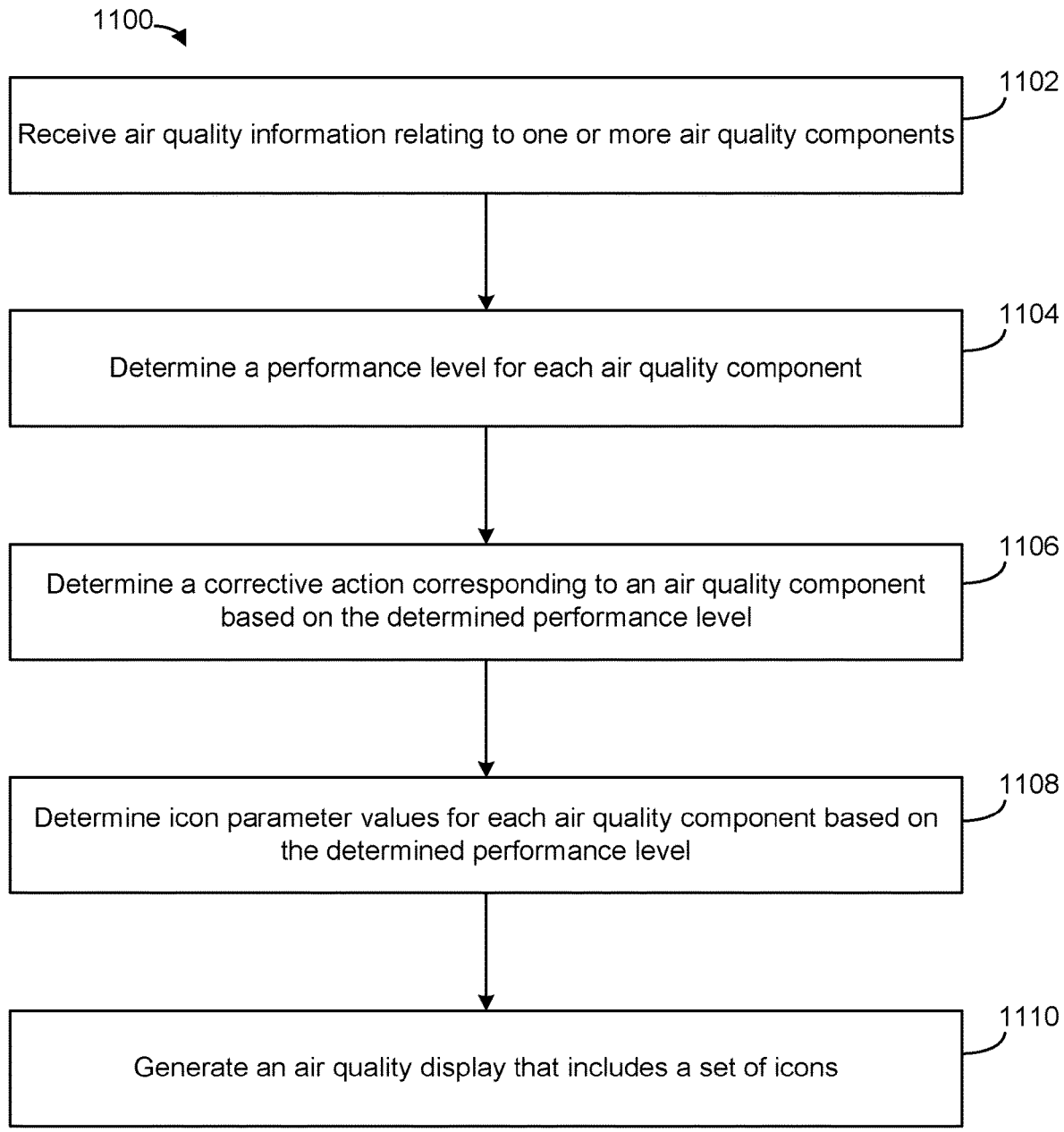
FIG. 11 is a flow chart of a process for generating an air quality display, according to some embodiments.

Turning now to FIG. 11, a process 1100 for displaying air quality information is shown, according to some embodiments. In some arrangements, control device 214 performs process 1100. In this regard, air quality analyzer module 744 and/or air quality display module 746 can be configured to perform one or more steps of process 1100. Control device 214, including air quality analyzer module 744 and/or air quality display module 746, may be communicably connected to one or more sensors 714 located throughout building 10. In this regard, control device 214, including air quality analyzer module 744 and/or air quality display module 746, can be configured to receive information relating to air quality within building 10 based on measurements received from the one or more sensors 714.

At step 1102 control device 214 receives air quality information relating to one or more air quality components. In some embodiments, air quality analyzer module 744 is configured to perform step 1102. Examples of air quality components include a volatile organic compound (VOC) level, a carbon monoxide level, a carbon dioxide level, a temperature measurement, a humidity level measurement, an oxygen level, allergens, pollutants, smoke, etc. In some embodiments, control device 214 transmits control signals to sensors 714 instructing sensors 714 to measure air quality of building 10 and to subsequently provide measurement information to building 10. In this regard, sensors 714 can be integrated with the control device 214 and located at various locations within building 10. In some embodiments, sensors 714 are configured to constantly or periodically measure air quality of building 10. In some embodiments, received air quality information relates to data provided by an external or third party source. For example, control device 214 can receive general data relating to air quality levels (e.g. pollen) or trends within a particular geographic area, such as via weather server 608.

At step 1104, control device 214 determines a performance level for each air quality component. In some embodiments, air quality analyzer module 744 is configured to perform step 1104. In some embodiments, control device 214 may initially associate received measurement information with an air quality component. For example, measurement information obtained from temperature sensor 716 can be associated with a temperature air quality component. Control device 214 may repeat this association process such that all received measurement information is associated with an air quality component. Control device 214 can then analyze measurement information of each air quality component to determine a corresponding performance level.

In some embodiments, control device 214 compares a measurement value to one or more threshold values to determine a performance level. For example, a measurement value corresponding to a VOC air component can be compared to two threshold values associated with VOC air quality. In an example embodiment, the two threshold values are one ppm (part per million) and ten ppm. If the measurement value of the VOC air component is below one ppm, control device 214 may determine a poor performance level for the VOC component. If the VOC measurement value is above one ppm and below ten ppm, control device 214 may determine a moderate performance level. If the VOC measurement value is above ten ppm, control device 214 may determine a high performance level.

Embodiments can use any variety of formulas, thresholds, and the like to determine a performance level. For example, a set of threshold values can be provided for comparison for each VOC type, and the set of threshold values can be more or fewer than two values. Another set of threshold values, which includes more or fewer than two threshold values, can be provided for a temperature air quality component, a humidity air quality component, etc. In some embodiments, a determined performance level corresponding to an air quality component can depend on one or more performance levels corresponding to another air quality component. For example, a measurement value of a VOC component may be compared to one set of threshold values when a temperature air quality component corresponds to a high performance level, and the measurement value of the VOC component may be compared to another set of threshold values when a temperature air quality component corresponds to a poor performance level.

At step 1106, control device 214 determines a corrective action corresponding to an air quality component based on the determined performance level. In some embodiments, air quality analyzer module 744 is configured to perform step 1106. In some embodiments, this step is omitted. Corrective actions can include controlling a fan, controlling a humidifier, opening a window, and any other action that can affect air quality. In some embodiments, control device 214 can be configured to initiate a corrective action based on a comparison of a performance level to a threshold value. For example, control device 214 can be configured to autonomously increase a fan speed when a performance level for a VOC component is below a predetermined threshold value. Alternatively or additionally, control device 214 can be configured to communicate the corrective action to a user. Referring to the above example, rather than autonomously increasing a fan speed, control device 214 can be configured to display an alert on user interface 702 suggesting an adjustment of a fan speed, or providing a recommendation, such as opening or closing windows in building 10 to help mitigate the air quality performance level.

At step 1108, control device 214 determines icon parameter values for each air quality component based on the determined performance level. In some embodiments, air quality display module 746 is configured to perform step 1108. In some embodiments, electronic display 706 of control device 214 is configured to display a set of air quality icons, whereby each air quality icon corresponds to an air quality component (e.g. a VOC icon, a temperature icon). Each displayed air quality icon can be configured according to icon parameters. Examples of icon parameters include color, size, and placement within the electronic display 706. In this regard, a value for an icon parameter can correspond to a performance level of the air quality component.

In an example embodiment, control device 214 receives measurement information relating to VOC air quality (at step 1102). Control device 214 is configured to determine values for three icon parameters: color, size, and placement. Control device 214 determines the icon parameter values based on the determined performance level (at step 1104). The color parameter can be configured such that a high performance level of the VOC component is represented by a green color, a moderate performance level is represented by a yellow color, and a poor performance level is represented by a red color. The size parameter can be configured such that a high performance level is represented by a small icon size, a moderate performance level is represented by a medium icon size, and a poor performance level is represented by a large icon size. The placement parameter can be configured such that a high performance level is represented by placing a corresponding icon in a bottom location of user interface 702, a moderate performance level is represented by placing the icon in a middle location of user interface 702, and a poor performance level is represented by placing the icon in an upward location of user interface 702. Embodiments can use any combination of icon parameters and parameter values.

At step 1110, control device 214 generates an air quality display that includes a set of icons. In some embodiments, air quality display module 746 is configured to perform step 1110. In some embodiments, each icon corresponds to an air quality component and is configured for display on electronic display 706 according to icon parameter values determined at step 1108. In this regard, each icon visually represents a performance level associated with the air quality component such that a user can easily see a performance level for each air quality component. Referring to the above example, a high performance level of a VOC component can be represented by an icon that is green in color, small in size, and located at a bottom location of electronic display 706. Control device 214 can generate and display icons for any number of air quality components using icon parameter values corresponding to a performance level of each air quality component. For example, in some embodiments control device 214 configures electronic display 706 to include a set of air quality icons corresponding to a VOC level, a carbon dioxide level, a carbon monoxide level, a temperature, and a humidity level.

In some embodiments, the generated air quality display additionally includes text, pictures, and/or touch-sensitive buttons for facilitating functions of control device 214. Any combination of text, pictures, and touch-sensitive buttons can be provided. For example, user interface 702 can include text indicating an air quality summary. The air quality summary can be determined by calculating a weighted average of individual performance levels of each air quality component. User interface 702 can also include a set of touch-sensitive buttons. In some embodiments, a touch-sensitive button may allow the user to selectively access additional details relating to an air quality icon. In this regard, control device 214 can be configured to receive a tap gesture via touch-sensitive panel 704 of user interface 702.

In some embodiments, the generated air quality display additionally includes a mitigation icon. The mitigation icon can visually represent the corrective action determined at step 1106. For example, if a corrective action includes controlling a fan, the mitigation icon can include a picture of a fan. The generated display can visually indicate an association between a mitigation icon and an air quality icon by, for example, laying a portion of the mitigation icon over a portion of the air quality icon. In this regard, a user can easily see an association between a corrective action visually represented by a mitigation icon and an air quality performance level visually represented by an air quality icon.

Figure 12:
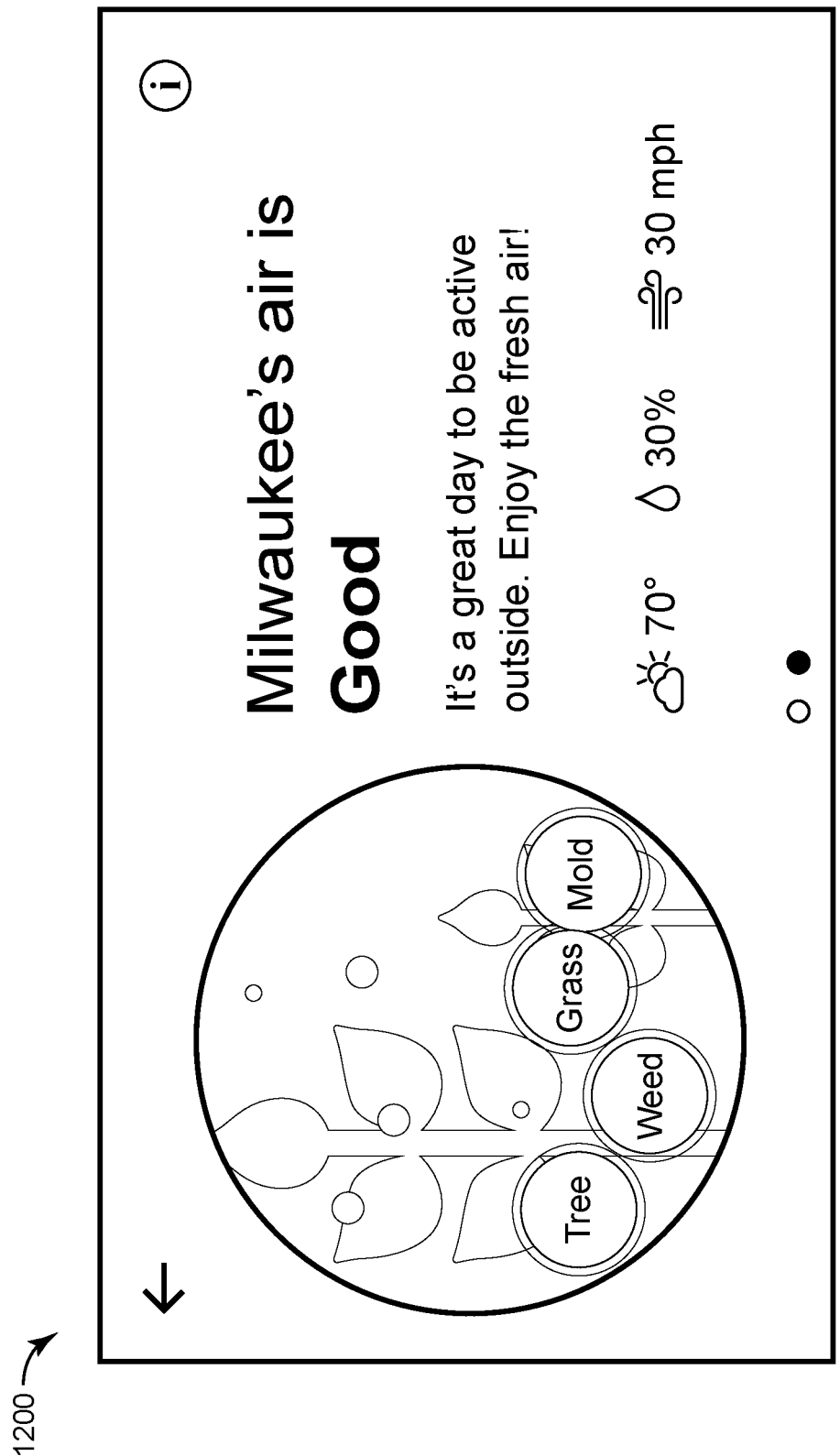
FIG. 12 is another user interface illustrating an air quality display displayed on the multi-function thermostat of FIGS. 7-8, according to some embodiments.

In some embodiments, the generated air quality display additionally includes text, pictures, and/or touch-sensitive buttons relating to outdoor air quality. In some embodiments, outdoor air quality information is provided by an external or third party source. For example, control device 214 can receive general data relating to air quality levels or trends within a particular geographic area, such as via weather server 608. Text and pictures relating to outdoor air quality can include information relating to individual air quality components and/or an air quality summary corresponding to a particular geographic area. For example, referring to FIG. 12, a user interface 1200 includes text and a visual representation of a temperature value, a humidity value, and a wind speed value corresponding to a city. In embodiments, any combination of air quality components can be provided and configured for display on user interface 702. User interface 1200 also includes text describing an example air quality summary of the city and picture visually representing the air quality summary. Embodiments can use any combination of text, pictures, and/or touch-sensitive buttons for displaying the outdoor air quality summary.

Figure 13:
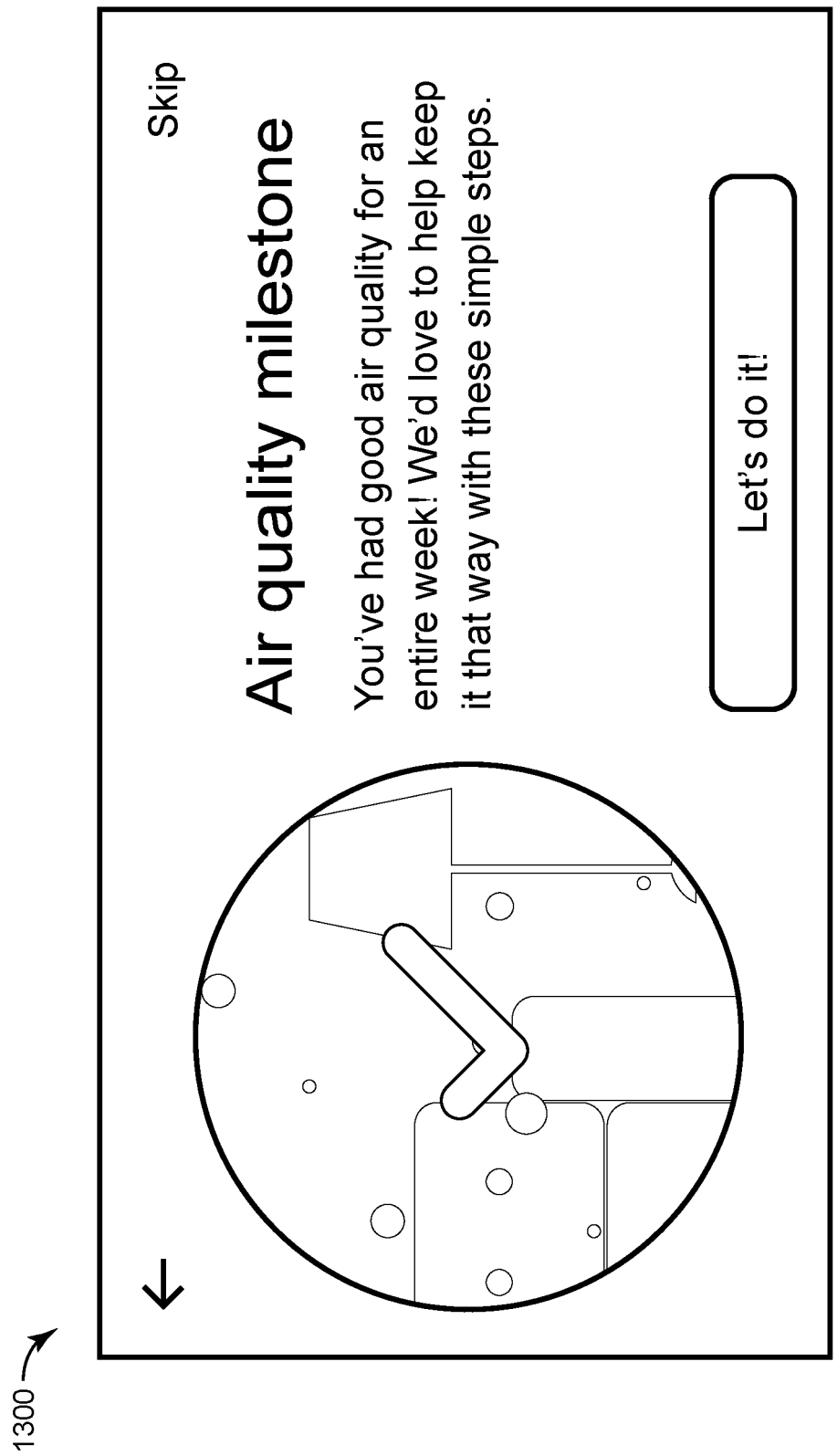
FIG. 13 is another user interface illustrating an air quality display displayed on the multi-function thermostat of FIGS. 7-8, according to some embodiments.

In some embodiments, the generated air quality display additionally includes text, pictures, and/or touch-sensitive buttons relating to an air quality milestone. The air quality milestone can relate to an air quality summary corresponding to a time period. For example, referring to FIG. 13, a user interface 1300 shows an air quality summary corresponding to good air quality over a one week period. In some embodiments, the air quality summary is determined by calculating an average of one or more performance levels, and comparing the average value to one or more thresholds. Embodiments can determine the air quality summary using any formula and combination of air quality components, etc. Embodiments can use any combination of text, pictures, and/or touch-sensitive buttons for displaying the air quality summary. For example, in some embodiments, user interface 702 is configured to include a touch-sensitive button that allows a user to selectively access additional air quality information, such as an improvement plan, air quality support, control device 214 settings, and the like.

Figure 14:
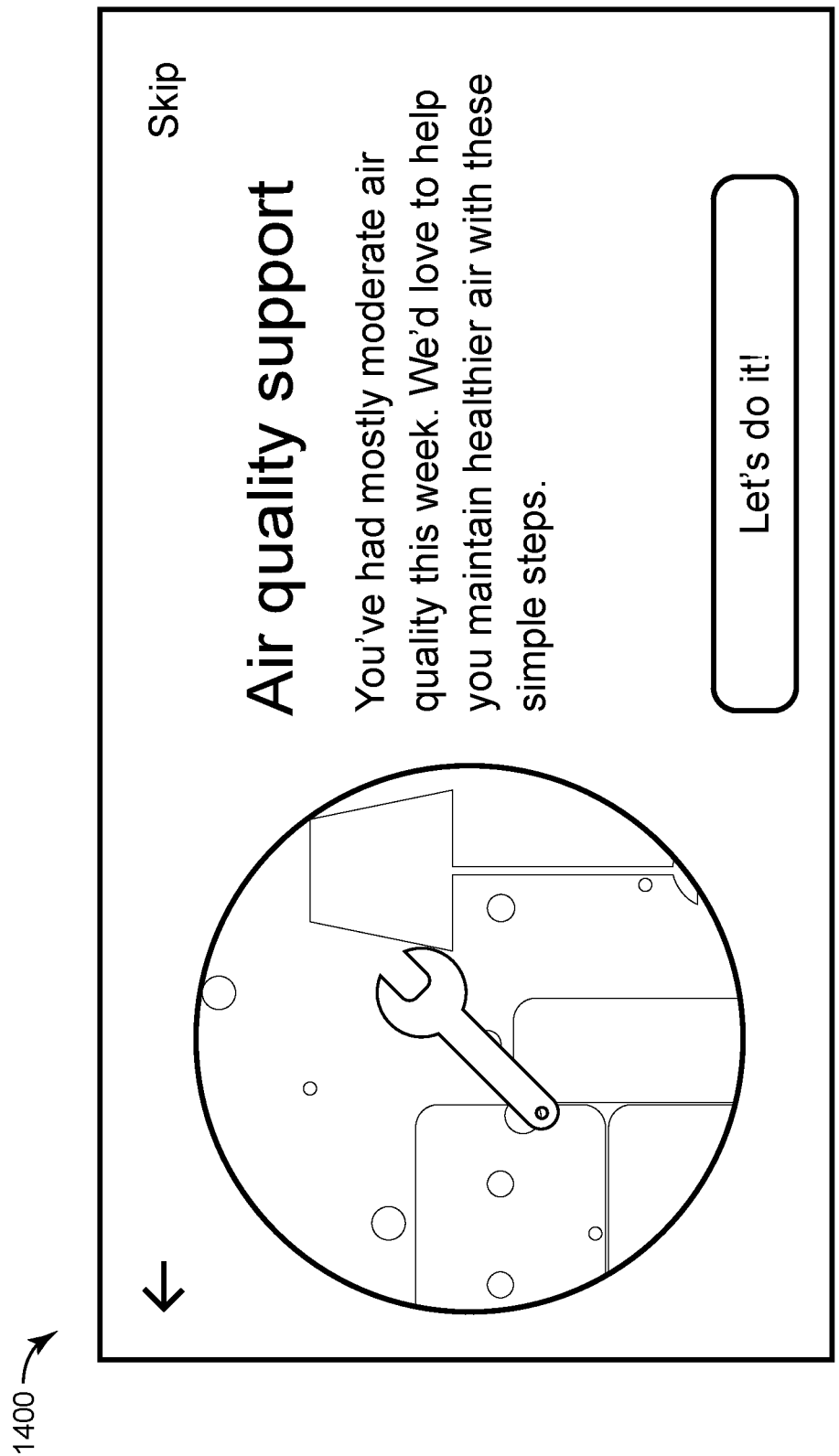
FIG. 14 is another user interface illustrating an air quality display displayed on the multi-function thermostat of FIGS. 7-8, according to some embodiments.

Referring to FIG. 14, another user interface 1400 is provided showing another example combination of text, pictures, and touch-sensitive buttons that can be displayed on control device 214. User interface 1400 is shown to include includes text, pictures, and/or touch-sensitive buttons relating to air quality support. The air quality support can relate to various actions that can be implemented by the control device 214 and/or user for improving air quality. For example, user interface 702 can include text detailing various steps to improve air quality. User interface 702 can also include one or more touch-sensitive buttons allowing the user to selectively access additional information relating to improving air quality. Embodiments can use any combination of text, pictures, and/or touch-sensitive buttons.

Configuration of Embodiments

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC system within a building comprising:
one or more sensors configured to measure air quality within the building; and
a thermostat comprising a processor and a memory, the processor configured to:
receive, from the one or more sensors, air quality information relating to one or more air quality components, the one or more air quality components including at least one of a volatile organic compound level or a carbon dioxide level;
determine a performance level corresponding to each air quality component;
determine one or more icon parameter values for each air quality component based on the corresponding performance level;
generate one or more icons that visually represent each air quality component based on the corresponding icon parameter values; and
present the one or more icons on a display of the thermostat.

2. The system of claim 1, wherein the one or more air quality components further include at least one of a carbon monoxide level or a relative humidity level.

3. The system of claim 1, wherein the one or more icon parameter values include a color parameter with parameter values corresponding to a set of colors, whereby each color in the set indicates a performance level.

4. The system of claim 1, wherein the one or more icon parameter values include a size parameter with parameter values corresponding to a set of icon sizes, whereby each icon size in the set indicates a performance level.

5. The system of claim 1, wherein the one or more icon parameter values include a placement parameter with parameter values corresponding to a set of icon placement locations, whereby each icon placement location in the set indicates a performance level.

6. The system of claim 1, wherein the processor is further configured to:
determine a corrective action associated with a performance level of an air quality component, wherein the corrective action represents an action for improving the performance level of the air quality component; and
generate a mitigation icon based on the determined corrective action.

7. The system of claim 6, wherein the corrective action includes one or more of the following: opening a window, closing a window, controlling a fan, controlling a humidifier, controlling an electronic air cleanser, and performing maintenance of an HVAC device or appliance.

8. The system of claim 3, wherein green indicates high performance level of the air quality component, yellow indicates moderate performance of the air quality component, and red indicates poor or unhealthy performance of the air quality component.

9. The system of claim 4, wherein increasing icon size indicates decreasing performance level.

10. A method of providing visual indications of air quality via a thermostat of an HVAC system within a building comprising:
measuring, by one or more sensors of the HVAC system, air quality within the building;
receiving, by the thermostat, air quality information relating to air quality components from the one or more sensors, the air quality components including a volatile organic compound level and a carbon dioxide level;
determining, by the thermostat, a performance level corresponding to each air quality component;
determining, by the thermostat, one or more icon parameter values for each air quality component based on the corresponding performance level;
generating, by the thermostat, one or more icons that visually represent each air quality component based on the corresponding icon parameter values; and
presenting, by the thermostat, the one or more icons on a display of the thermostat.

11. The method of claim 10, wherein the one or more air quality components further include at least one of a carbon monoxide level or a relative humidity level.

12. The method of claim 10, wherein the one or more icon parameter values include a color parameter with parameter values corresponding to a set of colors, whereby each color in the set indicates a performance level.

13. The method of claim 10, wherein the one or more icon parameter values include a size parameter with parameter values corresponding to a set of icon sizes, whereby each icon size in the set indicates a performance level.

14. The method of claim 10, wherein the icon parameters include a placement parameter with parameter values corresponding to a set of icon placement locations, whereby each icon placement location in the set indicates a performance level.

15. The method of claim 10, further comprising:
determining, by the thermostat, a corrective action associated with a performance level of an air quality component, wherein the corrective action represents an action for improving the performance level of the air quality component; and
generating, by the thermostat, a mitigation icon based on the determined corrective action.

16. The method of claim 15, wherein the corrective action includes one or more of the following: opening a window, closing a window, controlling a fan, controlling a humidifier, controlling an electronic air cleanser, and performing maintenance of an HVAC device or appliance.

17. The method of claim 12, wherein green indicates high performance level of the air quality component, yellow indicates moderate performance of the air quality component, and red indicates poor or unhealthy performance of the air quality component.

18. The method of claim 13, wherein increasing icon size indicates decreasing performance level.

19. The system of claim 1, wherein the one or more air quality components include an outdoor allergen level.

20. The method of claim 10, wherein the one or more air quality components include an outdoor allergen level.

* * * * *